United States Patent
Shimbo

(10) Patent No.: US 10,158,436 B2
(45) Date of Patent: Dec. 18, 2018

(54) RECEIVER APPARATUS AND RECEPTION METHOD

(71) Applicant: MITSUBISHI ELECTRIC CORPORATION, Tokyo (JP)

(72) Inventor: Daisuke Shimbo, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/535,660

(22) PCT Filed: Oct. 7, 2015

(86) PCT No.: PCT/JP2015/078443
§ 371 (c)(1),
(2) Date: Jun. 13, 2017

(87) PCT Pub. No.: WO2016/132591
PCT Pub. Date: Aug. 25, 2016

(65) Prior Publication Data
US 2017/0338900 A1    Nov. 23, 2017

(30) Foreign Application Priority Data
Feb. 17, 2015    (JP) .................. 2015-028206

(51) Int. Cl.
*H04B 1/7115*    (2018.01)
*H04B 17/21*    (2015.01)
(Continued)

(52) U.S. Cl.
CPC ............... *H04B 17/21* (2015.01); *H04B 1/06* (2013.01); *H04B 7/086* (2013.01); *H04B 7/10* (2013.01);
(Continued)

(58) Field of Classification Search
CPC ........ H04B 7/0408; H04B 17/21; H04B 1/06; H04B 1/69; H04B 7/0413
(Continued)

(56) References Cited

U.S. PATENT DOCUMENTS

| | | |
|---|---|---|
| 5,218,359 A | 6/1993 | Minamisono |
| 6,070,079 A | 5/2000 | Kuwahara |

(Continued)

FOREIGN PATENT DOCUMENTS

| | | |
|---|---|---|
| JP | 5-41607 A | 2/1993 |
| JP | 11-215543 A | 8/1999 |

(Continued)

*Primary Examiner* — Emmanuel Bayard
(74) *Attorney, Agent, or Firm* — Birch, Stewart, Kolasch & Birch, LLP

(57) ABSTRACT

A receiver apparatus 1 estimates a plurality of first electric-power delay profiles from a plurality of digital signals based on signals received via an array antenna; generates a synthesized electric-power delay profile q(m, l) by synthesizing these; generates an array process signal y(k) from the plurality of digital signals; estimates a second electric-power delay profile from the array process signal; generates a difference electric-power delay profile d(m, l) by subtracting the second electric-power delay profile from the synthesized electric-power delay profile; and creates a two-dimensional map indicating a relationship between delay times and arrival angles of incoming waves, on the basis of the difference electric-power delay profile and a direction of a null point. The receiver apparatus 1 changes the direction of the null point and repeats the above process, and estimates an arrival angle $\theta_1$ of a direct wave on the basis of the two-dimensional map.

6 Claims, 13 Drawing Sheets

(51) Int. Cl.
  *H04B 7/10* (2017.01)
  *H04B 1/06* (2006.01)
  *H04B 7/08* (2006.01)
  *H04L 25/02* (2006.01)
  *H04B 1/69* (2011.01)
  *H04L 5/00* (2006.01)
(52) U.S. Cl.
  CPC ............ *H04L 25/0204* (2013.01); *H04B 1/69* (2013.01); *H04L 5/0007* (2013.01)
(58) Field of Classification Search
  USPC .................. 375/130, 144, 148, 347, 349
  See application file for complete search history.

(56) References Cited

U.S. PATENT DOCUMENTS

| | | | | |
|---|---|---|---|---|
| 7,298,258 | B1* | 11/2007 | Hudgens | G07C 9/00111 340/3.1 |
| 2001/0010703 | A1* | 8/2001 | Ohsuge | H04B 1/7113 375/148 |
| 2001/0049295 | A1* | 12/2001 | Matsuoka | H04B 7/0617 455/562.1 |
| 2002/0072343 | A1* | 6/2002 | Miyatani | H04B 7/0848 455/272 |
| 2003/0125026 | A1* | 7/2003 | Tsunehara | H04W 64/00 455/435.1 |
| 2003/0210670 | A1* | 11/2003 | Kisigami | G01S 3/74 370/335 |
| 2004/0174300 | A1 | 9/2004 | Nakagawa | |
| 2004/0229637 | A1* | 11/2004 | Wang | H04B 1/7107 455/506 |
| 2005/0250564 | A1* | 11/2005 | Kishigami | H04B 7/086 455/575.7 |
| 2005/0276315 | A1* | 12/2005 | Shimizu | H04B 1/7113 375/148 |
| 2005/0280538 | A1 | 12/2005 | Kawai et al. | |
| 2006/0068790 | A1* | 3/2006 | Sawamoto | H04B 1/7113 455/441 |
| 2006/0187118 | A1* | 8/2006 | Kimata | H04B 7/0842 342/377 |
| 2007/0054623 | A1* | 3/2007 | Sato | H04B 7/0617 455/67.11 |
| 2011/0150066 | A1* | 6/2011 | Fujimoto | H04B 7/086 375/224 |
| 2015/0072634 | A1* | 3/2015 | Tsujimoto | H04B 7/0865 455/273 |
| 2017/0108579 | A1* | 4/2017 | Irvine | G01S 5/08 |

FOREIGN PATENT DOCUMENTS

| | | |
|---|---|---|
| JP | 2001-251233 A | 9/2001 |
| JP | 2003-8483 A | 1/2003 |
| JP | 2006-10345 A | 1/2006 |
| JP | 2009-206889 A | 9/2009 |
| JP | 4833144 B2 | 12/2011 |

* cited by examiner

RECEIVER APPARATUS AND RECEPTION METHOD

TECHNICAL FIELD

The present invention relates to a receiver apparatus and a reception method for receiving radio waves transmitted from a transmitter, and particularly relates to a technology for identifying a direction in which the transmitter exists on the basis of a reception signal.

BACKGROUND ART

A receiver apparatus (receiver) for receiving radio waves of a mobile phone, a wireless LAN (local area network), terrestrial digital broadcasting and so on receives not only a direct wave which is an incoming wave that directly arrives from a transmitter, but also a delay wave which is an incoming wave that arrives by being reflected and scattered by an obstacle such as a building and a structure. A communication environment in which the radio waves transmitted from the transmitter arrive at the receiver through various routes as described above is referred to as a multipath environment.

Directional characteristic control of an array antenna including a plurality of antenna elements is known as one of the technologies for suppressing degradation of reception performance in the multipath environment. In the array antenna, a directional characteristic can be given to the array antenna by controlling a plurality of weight coefficients that are used when a plurality of signals received through the plurality of antenna elements are synthesized. In the multipath environment, the degradation of the reception performance due to the influence of the delay wave can be suppressed by controlling the directional characteristic of the array antenna so that a main lobe of the array antenna is directed in an arrival direction of the direct wave (direction of the transmitter). It is necessary to accurately estimate an arrival angle of the direct wave, in order to improve the reception performance by the directional characteristic control of the array antenna.

In a case where the receiver is fixed and the direction of the transmitter is already known, the directional characteristic of the array antenna may be adjusted manually so that the main lobe of the array antenna is directed to the transmitter. However, in a case where the radio waves are received by the receiver in a moving object such as a car, the direction of the transmitter seen from the receiver changes, and thus it is necessary to estimate the arrival angle of the direct wave from a reception signal in which the direct wave and the delay wave are superposed. Incidentally, radio wave environments of wireless communication are classified into LOS (Line Of Sight) in which the transmitter exists in a field of view seen from the receiver and NLOS (None Line Of Sight) in which the transmitter exists outside the field of view seen from the receiver. The present application estimates the arrival angle of the direct wave, assuming the LOS environment.

In general, a MUSIC (MUltiple SIgnal Classification) method and an ESPRIT (Estimation of Signal Parameters via Rotational Invariance Techniques) method that use an eigenvalue and an eigenvalue vector of a correlation matrix of a signal received by the array antenna including N (N is an integer equal to or greater than 2) antenna elements are known as methods for measuring the arrival angle of the radio wave.

However, the number of incoming waves that can be measured by the MUSIC method or the ESPRIT method is limited, and is N waves at the maximum. In a case where the MUSIC method or the ESPRIT method is used under the multipath environment in which there are a large number of delay waves that arrive by being reflected by surrounding obstacles, in addition to the direct wave that directly arrives at the receiver from the transmitter, it is necessary for the antenna array to include the antenna elements of the same number as the maximum number of assumed incoming waves (direct wave and delay waves), and there is a drawback that the array antenna becomes too large.

Patent reference 1 describes a method for estimating the arrival angles of 3 or more waves by two antenna elements. In this method, the incoming waves having different delay times are separated by using complex delay profiles calculated from signals received by respective antenna elements, and the arrival angles of the incoming waves are estimated on the basis of the phase difference between the antenna elements of each separated incoming wave.

Patent reference 2 and patent reference 3 describe a method for estimating the arrival angle by utilizing multibeam by an array antenna. In this method, the arrival angles of incoming waves larger in number than the antenna elements can be estimated. In this method, first, the incoming waves having different arrival angles are separated by using a plurality of beamformings having different main lobe directions, and thereafter delay times are estimated on the basis of delay profiles calculated from the results of the respective beamformings. A rough arrival angle can be estimated from the direction of the main lobe of the beamforming of the largest electric power. Moreover, estimation accuracy of the arrival angle can be further improved by performing estimation of the arrival angle on the basis of the electric power difference between the beamformings whose main lobe directions are adjacent.

PRIOR ART REFERENCE

Patent Reference

PATENT REFERENCE 1: Japanese Patent No. 4833144 (pp. 14-15, FIG. 6)
PATENT REFERENCE 2: Japanese Patent Application Publication No. 2009-206889 (p 5, p 7, FIG. 2)
PATENT REFERENCE 3: Japanese Patent Application Publication No. 2003-8483 (p 6, p 7, FIG. 1)

SUMMARY OF THE INVENTION

Problem to be Solved by the Invention

When a vehicle, a building, or the like exists near the receiver, there is no large difference in length of a radio wave propagation path from the transmitter to the receiver between the direct wave and the delay wave, and thus the delay time becomes very short. If this delay time becomes shorter than the delay time resolution of the complex delay profile estimated in patent reference 1, the delay wave overlaps the direct wave on the estimated complex delay profile, and the both are unable to be separated. As a result, the arrival angle is estimated for the signal in which the direct wave and the delay wave have been synthesized, and there is a problem that estimation accuracy of the arrival angle of the direct wave degrades significantly. For example, the delay time resolution of the complex delay profile estimated by receiving a signal of 10 MHz bandwidth is approximately 100 ns of the inverse of the bandwidth. On the other hand, when an obstacle such as a vehicle exists at a position of 3 m from the receiver on an opposite side to the transmitter, the delay time relative to the direct wave is $\tau=(3/c)\times2=20$ ns. Here, c is the speed of light $3\times10^8$ m/s. In this case, the delay time is 10 ns in contrast to the delay time resolution 100 ns of the estimated complex delay profile, and the delay wave overlaps the direct wave on the estimation delay profile so that it looks like a single incoming wave is received. In the technology described in patent reference 1, the arrival angle is estimated for the signal in which the direct wave and the delay wave between which the arrival angles differ by 180° have been synthesized, and the estimation accuracy of the arrival angle of the direct wave degrades.

Moreover, in Patent Reference 2 and Patent Reference 3, the width of the main lobe can be made narrow when the number of antenna elements is large, and thus the plurality of incoming waves having different arrival angles can be separated by the multibeam. However, as the number of antenna elements becomes smaller, the width of the main lobe becomes wider, and thus it becomes difficult to separate the plurality of incoming waves having different arrival angles. Further, the electric power difference becomes smaller between the beamformings whose main lobe directions are adjacent, and thus there is a problem that the estimation accuracy of the arrival angle of the direct wave degrades.

Thus, an object of the present invention is to provide a receiver apparatus and a reception method which are capable of accurately estimating the arrival angle of the direct wave by a small number of antenna elements, under an environment in which the delay wave whose delay time is shorter than the resolution of a delay profile exists.

Means for Solving the Problem

A receiver apparatus according to the present invention is a receiver apparatus that receives incoming waves which are radio waves that arrive at an array antenna including a plurality of antenna elements, and the receiver apparatus includes: radio receiver units that generate a plurality of digital signals corresponding to a plurality of signals, on a basis of the plurality of signals received via the plurality of antenna elements; a first electric-power delay profile estimation unit that estimates a plurality of first electric-power delay profiles corresponding to the plurality of digital signals, on a basis of the plurality of digital signals; a synthesis unit that generates a synthesized electric-power delay profile by synthesizing the plurality of first electric-power delay profiles; an array control unit that changes a direction of a null point of the array antenna; an array processing unit that generates an array process signal by performing an array process for the plurality of digital signals by directing the null point in the direction changed by the array control unit; a second delay profile estimation unit that estimates a second electric-power delay profile from the array process signal; a difference unit that generates a difference electric-power delay profile obtained by subtracting the second electric-power delay profile from the synthesized electric-power delay profile; a two-dimensional map unit that creates a two-dimensional map indicating a relationship between delay times and arrival angles of the incoming waves, on a basis of the difference electric-power delay profile and the direction of the null point changed by the array control unit; and an arrival angle estimation unit that outputs an arrival angle of a component having a shortest delay time and a largest electric power, among the incoming waves on the two-dimensional map.

A reception method according to the present invention is a reception method for receiving incoming waves which are radio waves that arrive at an array antenna including a plurality of antenna elements, and the reception method includes: a reception step of generating a plurality of digital signals corresponding to a plurality of signals, on a basis of the plurality of signals received via the plurality of antenna elements; a first estimation step of estimating a plurality of first electric-power delay profiles corresponding to the plurality of digital signals, on a basis of the plurality of digital signals; a synthesis step of generating a synthesized electric-power delay profile by synthesizing the plurality of first electric-power delay profiles; an array process step of changing a direction of a null point of the array antenna and generating an array process signal by performing an array process for the plurality of digital signals by directing the null point in the changed direction; a second estimation step of estimating a second electric-power delay profile from the array process signal; a difference step of generating a difference electric-power delay profile obtained by subtracting the second electric-power delay profile from the synthesized electric-power delay profile; a two-dimensional map step of creating a two-dimensional map indicating a relationship between delay times and arrival angles of the incoming waves, on a basis of the difference electric-power delay profile and the changed direction of the null point; a step of changing the direction of the null point and executing the reception step, the first estimation step, the synthesis step, the array process step, the second estimation step, the difference step, and the two-dimensional map step; and an arrival angle estimation step of outputting an arrival angle of a component having a shortest delay time and a largest electric power, among the incoming waves on the two-dimensional map.

Effects of the Invention

According to the present invention, by calculating an electric-power delay profile of the incoming wave that arrives from a direction of a null point while the null point of the array antenna is scanned, it is possible to separate the delay wave whose delay time is shorter than the resolution of the electric-power delay profile and to estimate accurately the arrival angle of the direct wave, even if the number of the antenna elements is small.

MODE FOR CARRYING OUT THE INVENTION

1 First Embodiment 1-1 Configuration of First Embodiment

Figure 1:
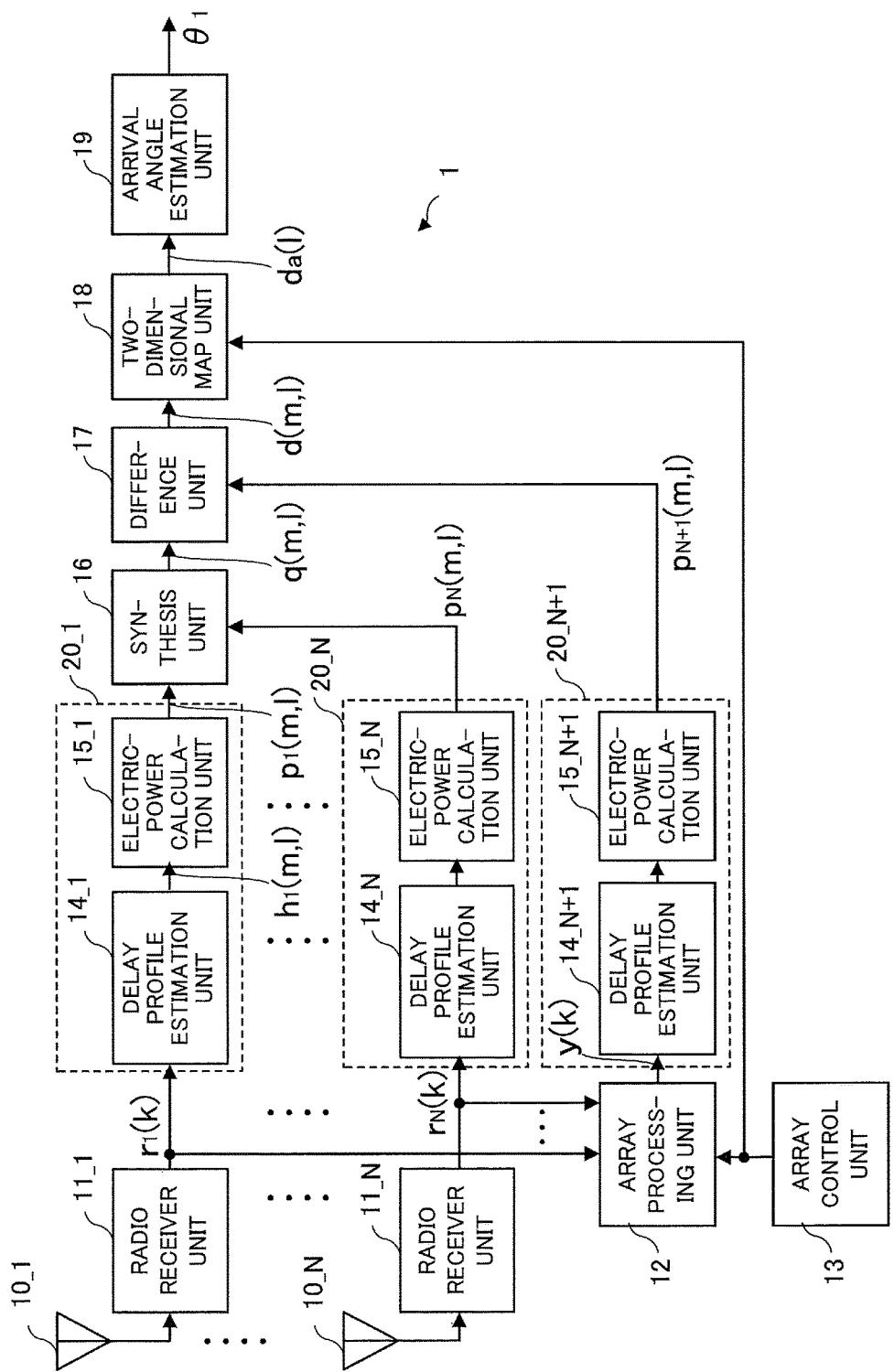
FIG. 1 is a block diagram schematically illustrating a configuration of a receiver apparatus according to a first embodiment of the present invention.

FIG. 1 is a block diagram schematically illustrating a configuration of a receiver apparatus 1 according to a first embodiment of the present invention. The receiver apparatus 1 receives a radio wave (incoming wave) emitted from a transmitter. As illustrated in FIG. 1, the receiver apparatus 1 according to the first embodiment includes N radio receiver units 11_1, ..., 11_N connected to N (N is an integer equal to or greater than 2) antenna elements 10_1, ..., 10_N composing an array antenna, an array processing unit 12, an array control unit 13, (N+1) delay profile estimation units 14_1, ..., 14_N+1, (N+1) electric-power calculation units 15_1, ..., 15_N+1, a synthesis unit 16, a difference unit 17, a two-dimensional map unit 18, and an arrival angle estimation unit 19. The delay profile estimation unit 14_$n$ and the electric-power calculation unit 15_$n$ compose an electric-power delay profile estimation unit 20_$n$. The electric-power delay profile estimation units 20_1, ..., 20_N are also referred to as first electric-power delay profile estimation units. The electric-power delay profile estimation unit 20_N+1 is also referred to as a second electric-power delay profile estimation unit. Moreover, the receiver apparatus 1 may include a control unit that controls the radio receiver units 11_1, ..., 11_N, the array processing unit 12, the array control unit 13, the delay profile estimation units 14_1, ..., 14_N+1, the electric-power calculation units 15_1, ..., 15_N+1, the synthesis unit 16, the difference unit 17, the two-dimensional map unit 18, and the arrival angle estimation unit 19.

The N radio receiver units 11_1, ..., 11_N generate N digital signals $r_1(k), ..., r_N(k)$ corresponding to N reception signals, on the basis of the N reception signals received via the N antenna elements 10_1, ..., 10_N. The N first electric-power delay profile estimation units 20_1, ..., 20_N estimate N electric-power delay profiles (first electric-power delay profiles) $p_1(m, l), ..., p_N(m, l)$ corresponding to the N digital signals, on the basis of the N digital signals $r_1(k), ..., r_N(k)$. The synthesis unit 16 generates a synthesized electric-power delay profile $q(m, l)$ by synthesizing the N first electric-power delay profiles $p_1(m, l), ..., p_N(m, l)$. The array control unit 13 is a directional characteristic control unit that designates (changes) a direction of a null point of the array antenna. The array control unit 13 makes the array antenna have a directional characteristic, by controlling a plurality of weight coefficients that are used when the plurality of signals received through the plurality of antenna elements are synthesized. The array processing unit 12 performs an array process by directing the null point in the direction designated (changed) by the array control unit 13, for the N digital signals $r_1(k), ..., r_N(k)$, to generate an array process signal $y(k)$. The second electric-power delay profile estimation unit 20_N+1 estimates a second electric-power delay profile $p_{N+1}(m, l)$ from the array process signal $y(k)$. The difference unit 17 generates a difference electric-power delay profile $d(m, l)$ by subtracting the second electric-power delay profile $p_{N+1}(m, l)$ from the synthesized electric-power delay profile $q(m, l)$. The two-dimensional map unit 18 creates a two-dimensional map indicating a relationship between delay times and arrival angles of the incoming waves, on the basis of the difference electric-power delay profile $d(m, l)$ and the direction of the null point of the array antenna designated (changed) by the array control unit 13. The arrival angle estimation unit 19 estimates and outputs an arrival angle $\theta_1$ of the direct wave among the incoming waves, on the basis of the two-dimensional map indicating the relationship between the delay times and the arrival angles of the incoming waves which is created by the two-dimensional map unit 18. While the null point of the array antenna is scanned (changed) in all directions by the array control unit 13, the two-dimensional map unit 18 creates the two-dimensional map indicating the relationship between the delay times and the arrival angles of the incoming waves, and the arrival angle estimation unit 19 estimates the arrival angle $\theta_1$ of the direct wave by determining a component having the shortest delay time and the largest electric power on the two-dimensional map as a direct wave component.

1-2 Operation of First Embodiment

The radio receiver units 11_1, ..., 11_N perform frequency conversion processes for the N reception signals received via the antenna elements 10_1, ..., 10_N respectively, to generate N baseband signals. The radio receiver units 11_1, ..., 11_N output the N digital signals obtained by performing analog-to-digital (AD) conversion of the N baseband signals. The N digital signals are supplied to the delay profile estimation units 14_1, ..., 14_N, respectively. Moreover, the N digital signals are supplied to the array processing unit 12.

The array processing unit 12 performs the array process for the N digital signals output from the radio receiver units 11_1, ..., 11_N. The signal y(k) output from the array processing unit 12 by the array process is expressed by the following expression (1).

$$y(k) = \sum_{n=1}^{N} w_n r_n(k)$$

Expression (1)

Here, $r_n(k)$ is a signal output from the radio receiver unit 11_n (n=1, 2, ..., N); k is a sample number (positive integer) after the AD conversion in the radio receiver unit 11_n; and $w_n$ is a complex weight coefficient for the signal $r_n(k)$.

The directional characteristic of the array antenna composed of the N antenna elements 10_1, ..., 10_N is changed, depending on the complex weight coefficients $w_1, ..., w_N$ of the expression (1), and the null point can be directed in an arbitrary direction. The array processing unit 12 performs the array process so as to direct the null point in the direction designated (changed) by the array control unit 13. The operation of the array control unit 13 will be described later.

The delay profile estimation units 14_1, ..., 14_N estimate (calculate) delay profiles from the signals $r_1(k), ..., r_N(k)$ output from the radio receiver units 11_1, ..., 11_N, respectively. The delay profile estimation unit 14_N+1 estimates (calculates) a delay profile from the signal y(k) output from the array processing unit 12. The estimation method of the delay profile depends on a transmission method employed by a communication system. The device and the method according to the present invention are applicable to any transmission method. Here, the estimation of the delay profile in an OFDM (Orthogonal Frequency Division Multiplex) transmission method and the estimation of the delay profile in a DSSS (Direct Sequence Spectrum Spread) transmission method, which are employed by many communication systems, will be described as examples.

First, the estimation of the delay profile in the OFDM transmission method will be described. The OFDM transmission method is a transmission method in which a symbol including a plurality of multiplexed orthogonal subcarriers is a unit of transmission. In many communication systems employing the OFDM transmission method, a part of the subcarriers is used as a known pilot subcarrier in the transmission and reception, in order to compensate for transmission path distortion at the receiver apparatus side. In the first embodiment, the delay profile is estimated by using this pilot subcarrier.

Figure 2:
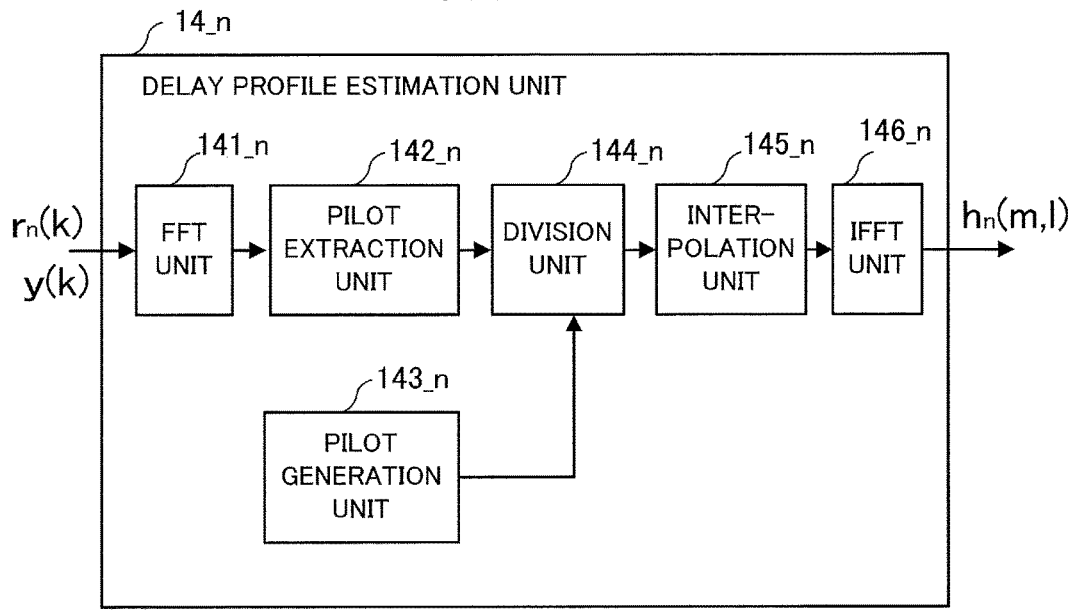
FIG. 2 is a block diagram schematically illustrating a configuration of a delay profile estimation unit in an OFDM transmission method.

FIG. 2 is a block diagram schematically illustrating a configuration of the delay profile estimation unit 14_n (n=1, ..., N+1) in the OFDM transmission method. As illustrated in FIG. 2, the delay profile estimation unit 14_n in the OFDM transmission method includes an FFT (Fast Fourier Transform) unit 141_n, a pilot extraction unit 142_n, a pilot generation unit 143_n, a division unit 144_n, an interpolation unit 145_n, and an IFFT (Inverse Fast Fourier Transform) unit 146_n. When n=1, ..., N, the FFT unit 141_n outputs each subcarrier by converting the signal $r_n(k)$ output from the radio receiver unit 11_n of FIG. 1 from a time axis to a frequency axis with respect to each symbol. When n=N+1, the FFT unit 141_n outputs subcarriers by converting the signal y(k) output from the array processing unit 12 from the time axis to the frequency axis with respect to each symbol. The pilot extraction unit 142_n extracts pilot carriers from the signal output from the FFT unit 141_n. The pilot generation unit 143_n generates a known pilot carrier. The division unit 144_n generates a transfer function of a transmission path that acts on the pilot carriers included in the reception signal, by dividing the pilot carrier extracted by the pilot extraction unit 142_n by the known pilot carrier generated by the pilot generation unit 143_n. The interpolation unit 145_n generates a transfer function of a transmission path for all subcarriers, by performing interpolation on the transfer function of the transmission path that acts on the pilot carriers in a symbol direction and a subcarrier direction. Lastly, the IFFT unit 146_n generates the delay profile by converting the transfer function of the transmission path to the transfer function of the time axis, and outputs this delay profile for each symbol.

Figure 3:
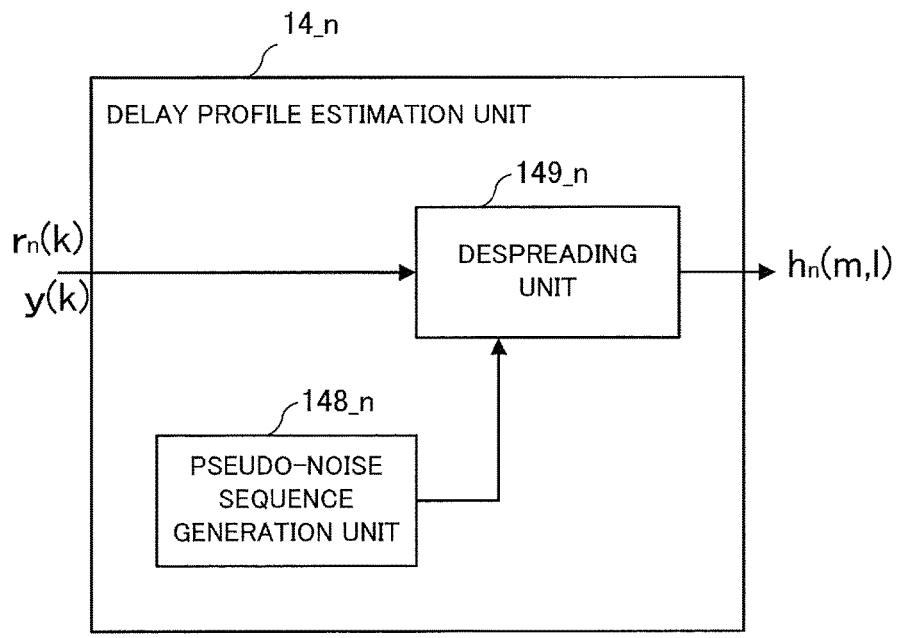
FIG. 3 is a block diagram schematically illustrating a configuration of a delay profile estimation unit in a DSSS transmission method.

Next, the delay profile estimation unit in the DSSS transmission method will be described. The DSSS transmission method is a method that transmits a signal spread by using a pseudo-noise sequence with respect to each symbol and despreads the signal at the receiver apparatus side. FIG. 3 is a block diagram schematically illustrating a configuration of the delay profile estimation unit 14_n (n=1, ..., N+1) in the DSSS transmission method. As illustrated in FIG. 3, the delay profile estimation unit 14_n of the DSSS transmission method includes a pseudo-noise sequence generation unit 148_n and a despreading unit 149_n. The pseudo-noise sequence generation unit 148_n generates a pseudo-noise sequence used at the time of spreading at the transmitter side. The despreading unit 149_n calculates and outputs a sliding correlation with the signal y(k) output from the radio receiver unit 11_n or the array processing unit 12 of FIG. 1 with respect to each symbol. This output of the despreading unit 149_n is the delay profile.

In FIGS. 2 and 3, the delay profile estimation unit 14_n outputs the delay profile for each symbol. The estimation result of the delay profile of the m-th symbol in the delay profile estimation unit 14_n is expressed by $h_n(m, l)$. Here, l is an index of the delay time.

In the case of the OFDM transmission method, the delay time resolution $\Delta\tau$ (s) is expressed by $\Delta\tau = 1/W_{OFDM}$, where $W_{OFDM}$ (Hz) denotes a bandwidth.

Moreover, in the case of the DSSS transmission method, the delay time resolution $\Delta\tau$ (s) is expressed by $\Delta\tau = 1/W_{DSSS}$, where $W_{DSSS}$ (Hz) denotes a chip rate.

Moreover, a length L of the delay profile is set such that $L \times \Delta\tau$ becomes longer than a maximum delay time that is conceivable in the communication system.

The electric-power calculation units 15_1, ..., 15_N+1 of FIG. 1 calculate and output the electric powers $p_n(m, l)$ indicated by the following expression, with respect to each delay time of the delay profiles $h_1(m, l), ..., h_{N+1}(m, l)$ output from the delay profile estimation units 14_1, ..., 14_N+1.

$$P_n(m,l) = |h_n(m,l)|^2$$

Moreover, the electric-power calculation units 15_1, ..., 15_N+1 may output amplitudes of the delay profiles, instead of the electric powers of the delay profiles. In the following, the electric powers $p_n(m, l)$ of the delay profiles output from the electric-power calculation units 15_1, ..., 15_N+1 are also referred to as the electric-power delay profiles.

The synthesis unit 16 of FIG. 1 synthesizes the electric-power delay profiles $p_1(m, l), ..., p_N(m, l)$ output from the electric-power calculation units 15_1, ..., 15_N, as in the following expression (2). In the following, the output q(m, l) of the synthesis unit 16 is referred to as the synthesized electric-power delay profile.

$$q(m, l) = \sum_{n=1}^{N} c_n p_n(m, l) \qquad \text{Expression (2)}$$

In the expression (2), $c_n$ (n=1, ..., N) is a synthesis coefficient, and is an arbitrary value that satisfies the condition of the following expression (3).

$$\sum_{n=1}^{N} c_n = 1 \qquad \text{Expression (3)}$$

When $c_n=1/N$, the synthesis unit 16 synthesizes the N electric-power delay profiles $p_1(m, l), \ldots, p_N(m, l)$, and outputs the synthesized electric-power delay profile $q(m, l)$. Moreover, when $c_1=1$ and $c_j=0$ (j=2, ..., N), the synthesis unit 16 outputs the electric-power delay profile $p_1(m, l)$ of the signal received by the antenna element 10_1 as the synthesized electric-power delay profile $q(m, l)$.

The difference unit 17 of FIG. 1 outputs the difference electric-power delay profile d(m l) that is obtained by subtracting the electric-power delay profile $p_{N+1}$(m l) which is the output of the electric-power calculation unit 15_N+1, from the synthesized electric-power delay profile $q(m, l)$ which is the output of the synthesis unit 16. That is, the difference electric-power delay profile d(m, l) is expressed by the following expression.

$$d(m,l) = q(m,l) - p_{N+1}(m,l)$$

Figure 4A:
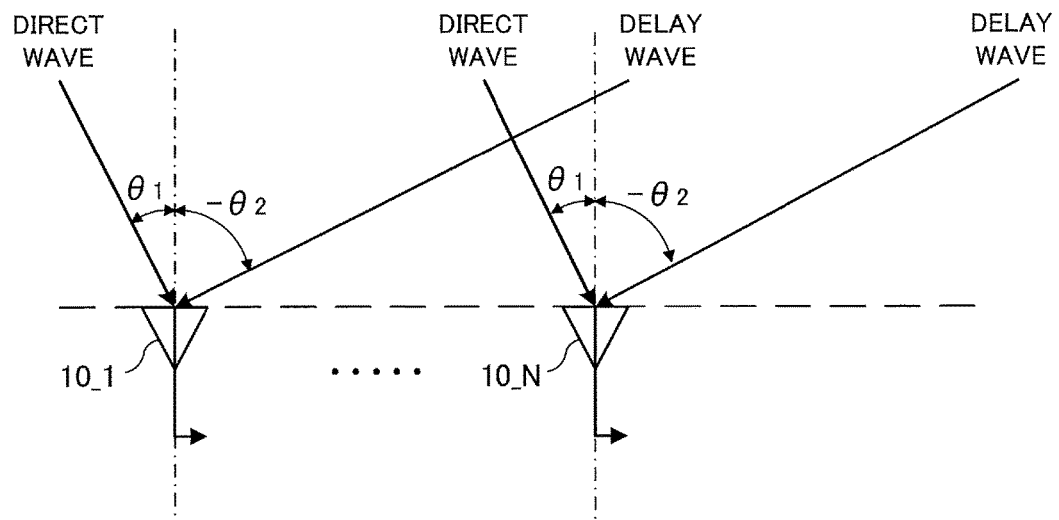
FIGS. 4(a) and 4(b) are diagrams illustrating an angle profile and a delay profile in a case where a delay time is long.
Figure 4B:
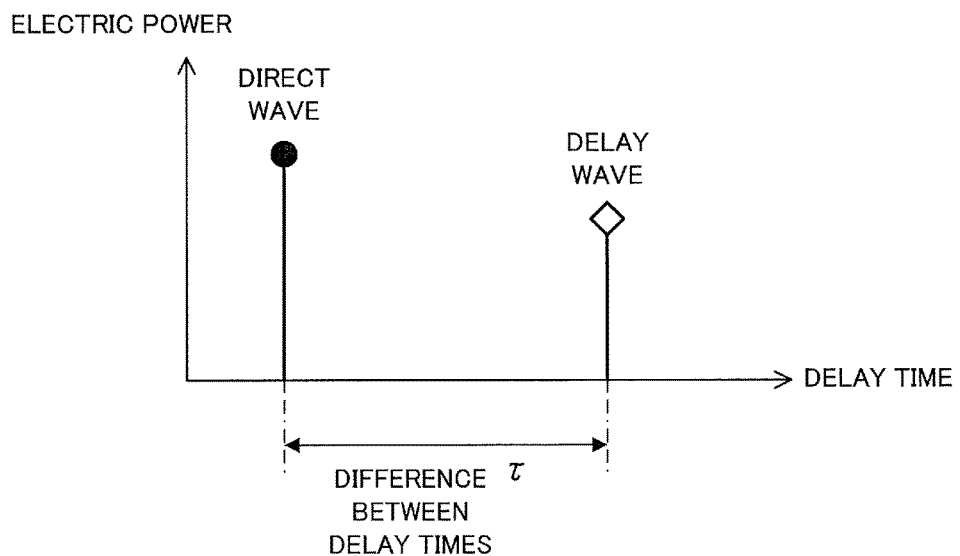

FIGS. 4(a) and 4(b) are diagrams illustrating an angle profile and a delay profile in a case where the delay time is long. Columns A, B, C of FIG. 5 are diagrams illustrating situations of separation of the arrival angles in the case where the delay time is long.

Here, a case in which a direct wave and a delay wave such as illustrated in FIGS. 4(a) and 4(b) are received is considered. The arrival angles of the direct wave and the delay wave are $\theta_1$ and $-\theta_2$ respectively, and the difference between the delay times of the direct wave and the delay wave is $\tau$. If the direction $\theta_{NULL}$ of the null point of the array processing unit 12 is equal to $\theta_1$ under this environment, the synthesized electric-power delay profile $q(m, l)$ output from the synthesis unit 16, the electric-power delay profile $p_{N+1}$(m, l) after the array process output from the electric-power calculation unit 15_N+1, and the difference electric-power delay profile d(m, l) output from the difference unit 17 are as in the column A of FIG. 5. In the column A of FIG. 5, the output $q(m, l)$ of the synthesis unit 16 includes components of all the incoming waves; the output $p_{N+1}$(m, l) of the electric-power calculation unit 15_N+1 includes only the delay wave component; and thus the output (difference electric-power delay profile) d(m, l) of the difference unit 17 includes the component of the direct wave. That is, the difference electric-power delay profile d(m, l) includes the incoming wave component that arrives from the direction of the null point.

Figure 5:
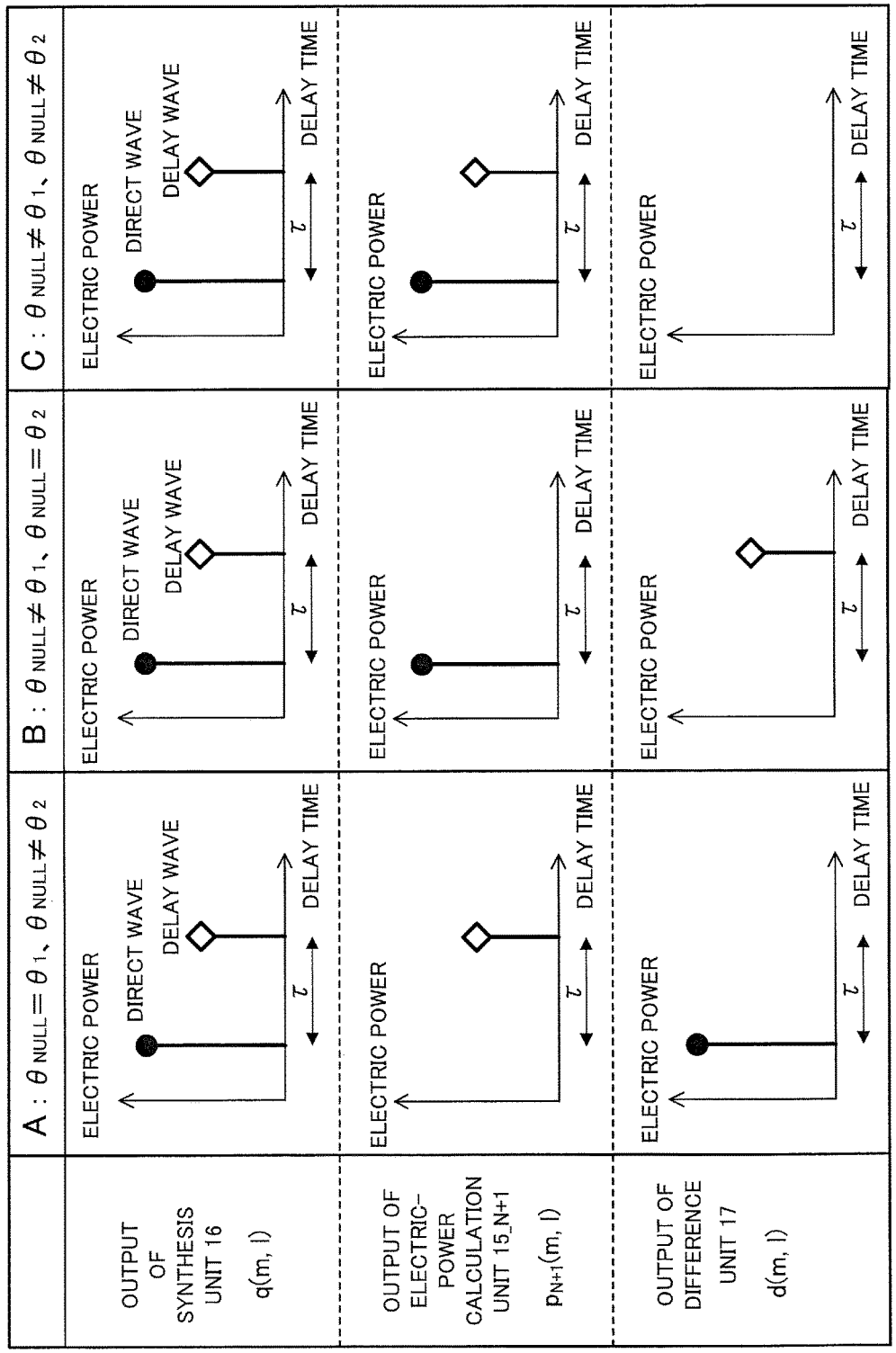
FIG. 5 is a diagram illustrating situations of separation of arrival angles in the case where a delay time is long.

In the same way, the column B and the column C of FIG. 5 illustrate a case in which the direction $\theta_{NULL}$ of the null point is equal to $\theta_2$, and a case in which the direction $\theta_{NULL}$ of the null point differs from any of $\theta_1$ and $\theta_2$. In the column B of FIG. 5, the null point is directed in an arrival direction of the delay wave, and thus the delay wave component is included in the difference electric-power delay profile d(m, l). In the column C of FIG. 5, the null point is directed in a direction in which the incoming wave does not exist, and thus the incoming wave component is not included in the difference electric-power delay profile d(m, l).

Here, it is assumed that antenna gain of the array processing unit 12 falls precipitously at the null point.

The array control unit 13 of FIG. 1 scans (changes) the direction in which the null point is directed by the array processing unit 12. Specifically, an initial direction of the null point is set to $\theta_{NULL} = -\pi$, and the scan is sequentially performed as in $$\theta_{NULL} = -\pi + a \times \Delta\theta \; (a=0,1, \ldots, 2\pi/\Delta\theta - 1).$$

Although the scan of all directions from $-\pi$ to $\pi$ is completed with respect to $0 \leq a < 2\pi/\Delta\theta$, the scan may be continued ongoingly. The index a is incremented every M symbols. This scan direction $\theta_{NULL}$ of the null point is also used in the two-dimensional map unit 18, as well as in the array processing unit 12.

The two-dimensional map unit 18 of FIG. 1 creates the two-dimensional map on a coordinate system in which the delay time and the arrival direction (arrival angle) are coordinate axes, by using the electric-power delay profile (output of the difference unit 17) d(m, l) of the incoming wave that arrives from the direction of the null point and the scan direction (output of the array control unit 13) of the null point. Specifically, first, the two-dimensional map unit 18 calculates, by the following expression (4), an average $d_a(l)$ of difference electric-power delay profiles for M symbols output during a period in which the null point is directed to $$\theta_{NULL} = -\pi + a\Delta\theta \; (a=0,1, \ldots, 2\pi/\Delta\theta - 1).$$

The average $d_a(l)$ of the difference electric-power delay profiles is also referred to as an average difference electric-power delay profile.

$$d_a(l) = \sum_{m=1}^{M} d(m, l) \qquad \text{Expression (4)}$$

Next, the two-dimensional map unit 18 stores the average difference electric-power delay profile $d_a(l)$ (l=0, 1, ..., L), which is expressed by the expression (4), in the a-th row in a two-dimensional array ($2\pi/\Delta\theta$ rows, L columns) prepared in advance.

Figure 6:
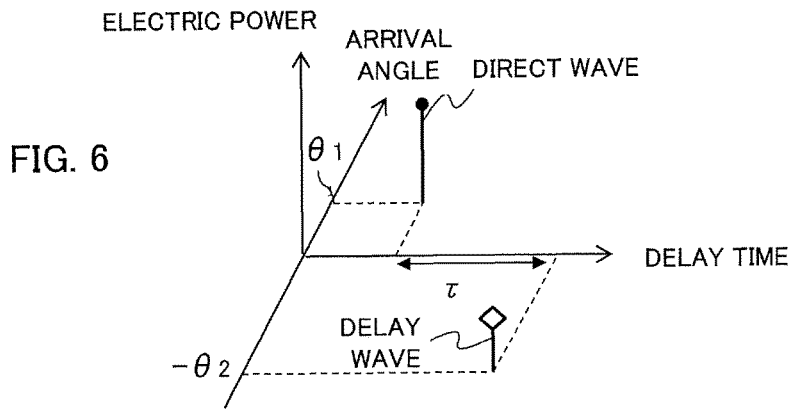
FIG. 6 is a diagram illustrating a two-dimensional map indicating a relationship between a delay time and an arrival angle in the case where a delay time is long.

FIG. 6 is a diagram illustrating the two-dimensional map indicating the relationship between the delay time and the arrival angle in the case where the difference $\tau$ between the delay times is long. For example, the two-dimensional map indicating the relationship between the delay time and the arrival angle is as in FIG. 6, in the case of the radio wave environment illustrated in FIGS. 4(a) and 4(b). As illustrated in FIG. 6, the component of the direct wave exists at a position of the arrival angle $\theta_1$; the component of the delay wave exists at a position of the arrival angle $-\theta_2$; and the difference between the delay times of the respective components is $\tau$.

The arrival angle estimation unit 19 of FIG. 1 estimates the arrival angle $\theta_1$ of the direct wave by using the two-dimensional map indicating the relationship between the delay time and the arrival angle. Specifically, a certain threshold value is set; components that exceed the threshold value are searched for in the two-dimensional map; and the component having the shortest delay time is selected among them. This selected component is determined to be the direct wave. In a case where a plurality of components are selected, the component having the largest electric power is determined to be the direct wave. Lastly, the arrival angle estimation unit 19 outputs the arrival angle $\theta_1$ determined to be the component of the direct wave in the two-dimensional map.

Incidentally, the above threshold value may be a predetermined value, and may be a value obtained by attenuating the maximum value on the two-dimensional map by a certain predetermined amount.

The cases of the radio wave environment of FIGS. 4(a) and 4(b) indicate that the direct wave and the delay wave are selected as the components larger than the threshold value in FIG. 6; the direct wave is correctly identified as the component having the shortest delay time among them; and the arrival angle $\theta_1$ is output.

A fact that the first embodiment can accurately estimate the arrival angle $\theta_1$ of the direct wave even under an environment in which the delay wave whose delay time is shorter than the resolution $\Delta\tau$ of the delay profile exists will be described by using FIGS. 7 (a) and 7 (b), FIG. 8, and FIG. 9.

Figure 7A:
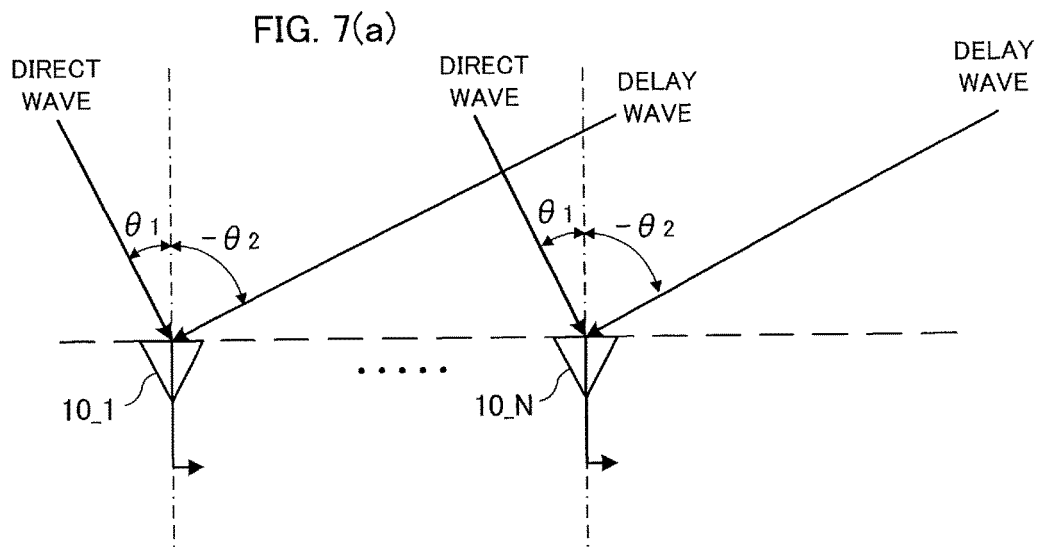
FIGS. 7(a) and 7(b) are diagrams illustrating an angle profile and a delay profile in a case where a delay time is short.
Figure 7B:
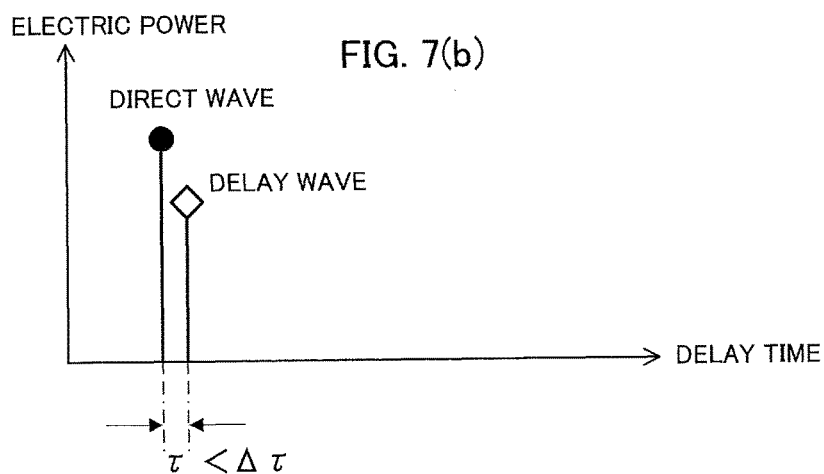

FIGS. 7(a) and 7(b) are diagrams illustrating the angle profile and the delay profile in a case where the delay time is short. FIGS. 7(a) and 7(b) illustrate a radio wave environment in which a delay wave whose delay time difference $\tau$ is shorter than the resolution $\Delta\tau$ of the delay profile ($\tau<\Delta\tau$) exists. The arrival angles of FIG. 7 (a) are the same as those of FIG. 4(a), and the delay times of FIG. 7(b) differ from those of FIG. 4(b).

Figure 8:
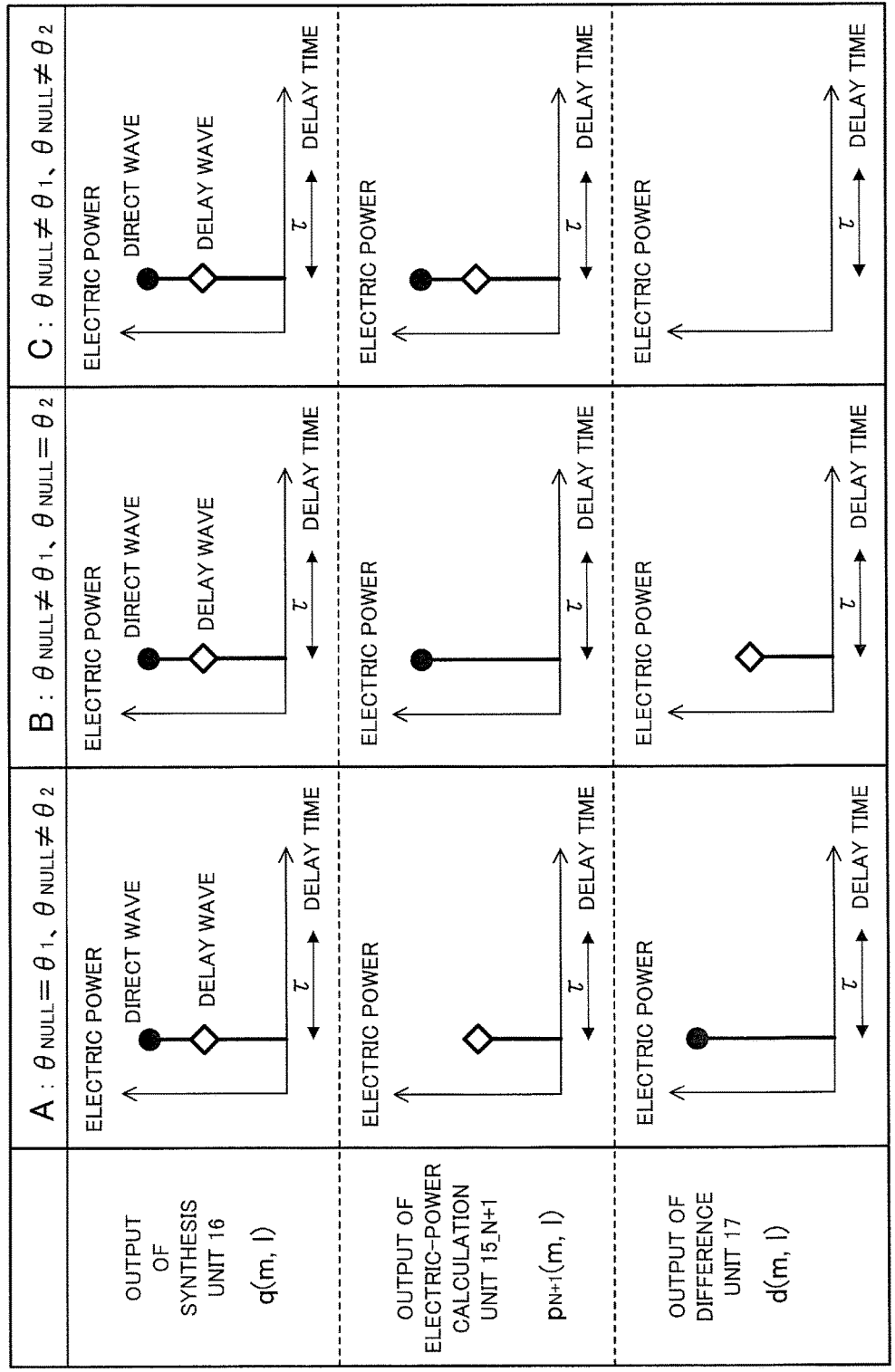
FIG. 8 is a diagram illustrating situations of separation of arrival angles in the case where a delay time is short.

FIG. 8 is a diagram illustrating the synthesized electric-power delay profile (output of the synthesis unit 16) q(m, l), the electric-power delay profile (output of the electric-power calculation unit 15_N+1) $p_{N+1}$(m, l) when the null point is directed in a specific direction, and the difference electric-power delay profile (output of the difference unit 17) d(m, l), which are calculated under this environment. FIG. 8 is a schematic diagram, in which the direct wave and the delay wave are indicated by a black circle mark and a white rhombus respectively and thus are distinguishable. In fact, the delay time of the delay wave is shorter than the delay time resolution of the delay profile, and thus the components of the direct wave and the delay wave overlap in the synthesized electric-power delay profile q(m, l). That is, it looks like that there is only one incoming wave.

Columns A, B, C of FIG. 8 are diagrams illustrating situations of separation of the arrival angles in the case where the delay time is short. In the first embodiment, the direct wave and the delay wave described above can be separated by scanning (changing) the null point in the array process. For example, if the direction $\theta_{NULL}$ of the null point of the array processing unit 12 is equal to $\theta_1$, the direct wave is suppressed by the array processing unit 12, and thus the direct wave component is not included in the output of the electric-power calculation unit 15_N+1, as illustrated in the column A of FIG. 8. Thus, the component of the direct wave is included, and the delay wave component is not included, in the output of the difference unit 17. That is, the incoming wave that arrives from the direction of the null point is included in the difference electric-power delay profile d(m, l), in the same way as the case of the radio wave environment of FIGS. 4(a) and 4(b), regardless of the delay time of the delay wave.

In the same way, a case in which the direction $\theta_{NULL}$ of the null point is equal to $\theta_2$ and a case in which the direction $\theta_{NULL}$ of the null point differs from any of $\theta_1$ and $\theta_2$ are illustrated in the column B and the column C of FIG. 8. In the column B of FIG. 8, the null point is directed in the arrival direction of the delay wave, and thus the delay wave component is included in the difference electric-power delay profile d(m, l). In the column C of FIG. 8, the null point is directed in a direction in which the incoming wave does not exist, and thus the incoming wave components are not included in the difference electric-power delay profile d(m, l).

Figure 9:
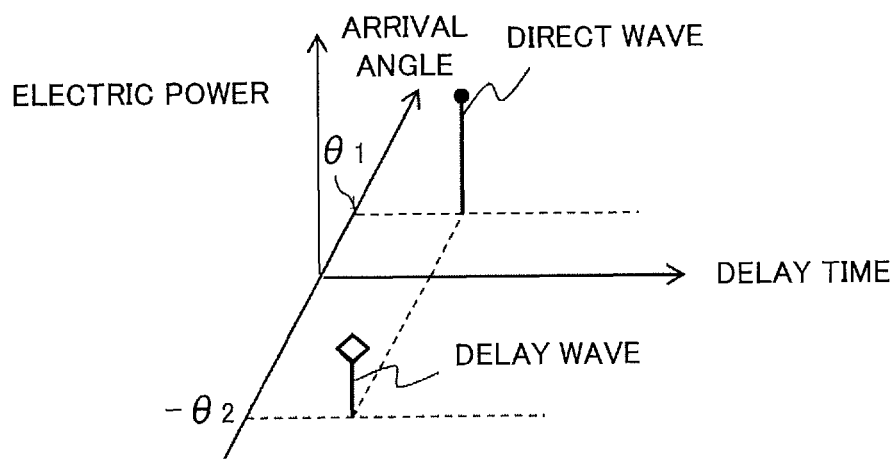
FIG. 9 is a diagram illustrating a two-dimensional map indicating a relationship between a delay time and an arrival angle in the case where a delay time is short.

FIG. 9 is a diagram illustrating the two-dimensional map indicating the relationship between the delay time and the arrival angle in the case where the delay time is short. The two-dimensional map obtained by scanning the null point in all directions is illustrated in FIG. 9. Although the direct wave and the delay wave are selected as larger components than the threshold value in the two-dimensional map of FIG. 9, the delay time is shorter than the resolution of the delay profile, and thus both components exist at the index of the same delay time. In a case where a plurality of components exist at the same delay time, the component having the largest electric power may be determined to be the direct wave, because the delay wave loses the electric power when reflected by an obstacle and thus becomes smaller in electric power than the direct wave. From FIG. 9 it is realized that the one having the larger electric power is determined to be the direct wave, among the direct wave and the delay wave that exist at the index of the same delay time, and the arrival angle $\theta_1$ is output from the arrival angle estimation unit 19.

1-3 Effect of First Embodiment

The device described in patent reference 1 is unable to separate the direct wave and the delay wave, under the environment in which the delay wave whose delay time is shorter than the delay time resolution of the delay profile exists, and the estimation accuracy of the arrival angle of the direct wave degrades. In contrast, according to the receiver apparatus 1 and the reception method according to the first embodiment, there is an effect that the direct wave and the delay wave can be separated by utilizing the null point of the array antenna, and that the arrival angle $\theta_1$ of the direct wave can be estimated accurately, by the principle illustrated in FIGS. 5 and 8.

Moreover, in general, it is known that the null point of the array antenna has a sharper directional characteristic than the main lobe. Hence, there is an effect that the receiver apparatus according to the first embodiment can separate a plurality of incoming waves even with a smaller number of antenna elements in comparison with the method described in patent reference 2 and the device described in patent reference 3 which separate the incoming waves by using the main lobe, and that the estimation accuracy of the arrival angle $\theta_1$ of the direct wave can be improved.

2 Second Embodiment

2-1 Configuration of Second Embodiment

The receiver apparatus 1 according to the first embodiment utilizes the antenna gain of the array processing unit 12 of FIG. 1 falling precipitously at the null point. However, in fact, as the number of antenna elements that compose the array antenna becomes smaller, the attenuation of the antenna gain becomes more gradual around the null point, and as a result a width of the null point becomes wider. The width of the null point is narrower than the main lobe, and thus if the number of antenna elements is the same number, the receiver apparatus according to the first embodiment estimates the arrival angle of the direct wave more accurately than the device and the method described in patent references 2 and 3. However, as the number of antenna elements that compose the array antenna becomes smaller, the width of the null point spreads, and the estimation accuracy of the arrival angle $\theta_1$ of the direct wave degrades depending on this spread of the width. Thus, a receiver apparatus 2 according to a second embodiment corrects the spread of the width of the null point on the two-dimensional map, and suppresses the degradation of the estimation accuracy of the arrival angle $\theta_1$ of the direct wave.

Figure 10:
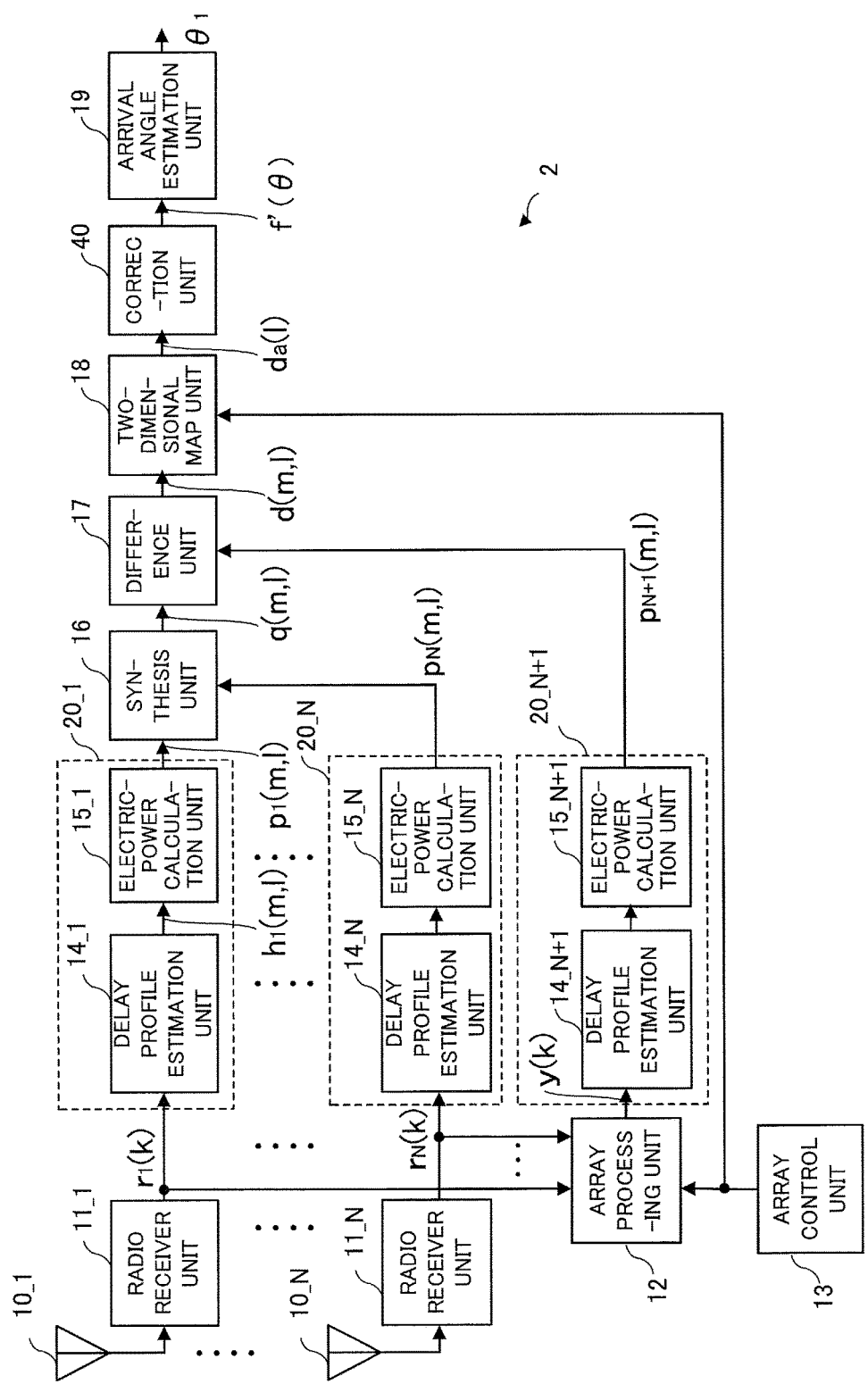
FIG. 10 is a block diagram schematically illustrating a configuration of a receiver apparatus according to a second embodiment of the present invention.

FIG. 10 is a block diagram schematically illustrating a configuration of the receiver apparatus 2 according to the second embodiment of the present invention. In FIG. 10, the components that are the same as or correspond to the components illustrated in FIG. 1 are denoted with the same reference signs as the reference signs illustrated in FIG. 1. The receiver apparatus 2 according to the second embodiment differs from the receiver apparatus 1 according to the first embodiment in including a correction unit 40 between the two-dimensional map unit 18 and the arrival angle estimation unit 19. Except for this point, the second embodiment is the same as the first embodiment.

The correction unit 40 of FIG. 10 corrects the spread of the width of the null point, by performing a filter process in the arrival angle direction, in the two-dimensional map indicating the relationship between the delay time and the arrival angle of the incoming wave.

2-2 Operation of Second Embodiment

Figure 11A:
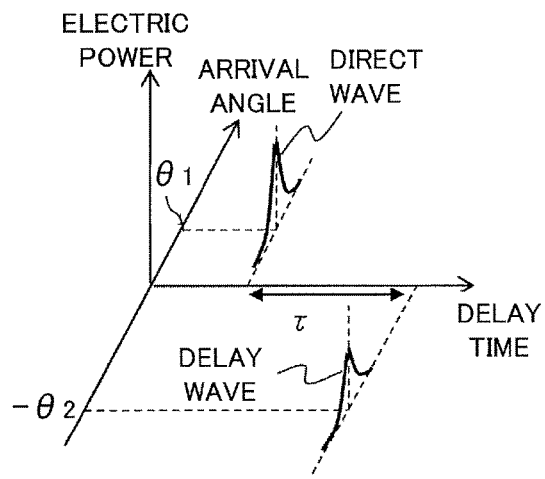
FIGS. 11(a) and 11(b) are diagrams illustrating a two-dimensional map in the case where a delay time is long in the second embodiment.
Figure 11B:
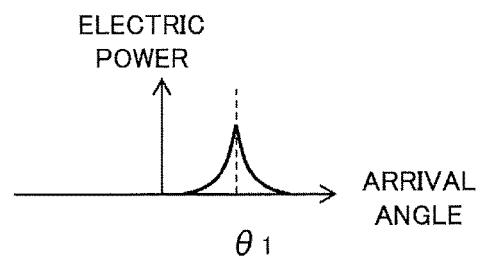

FIGS. 11(a) and 11(b) are diagrams illustrating the two-dimensional map indicating the relationship between the delay time and the arrival angle in the case where the delay time is long in the second embodiment. Here, the radio wave environment illustrated in FIG. 4 will be considered. If the number of antenna elements is small and the width of the null point is wide, the two-dimensional map indicating the relationship between the delay time and the arrival angle is as in FIG. 11(a), and $f_a(\theta)$ obtained by cutting out the component of the direct wave in the arrival angle direction, is illustrated in FIG. 11(b). A shape of the spread in the arrival angle direction of FIG. 11(b) is decided uniquely from a shape of the directional characteristic of the array antenna, and thus is known. When this known spread of the arrival angle is $g(\theta)$, FIG. 11(b) is expressed by the following expression.

$$f_a(\theta)=g(\theta-\theta_1)=g(\theta)\otimes\delta(\theta-\theta_1) \quad \text{Expression (5)}$$

($\otimes$ is a convolution operation)

In the expression (5), $\delta(\theta)$ is a delta function which is 1 when $\theta=0$.

Figure 12A:
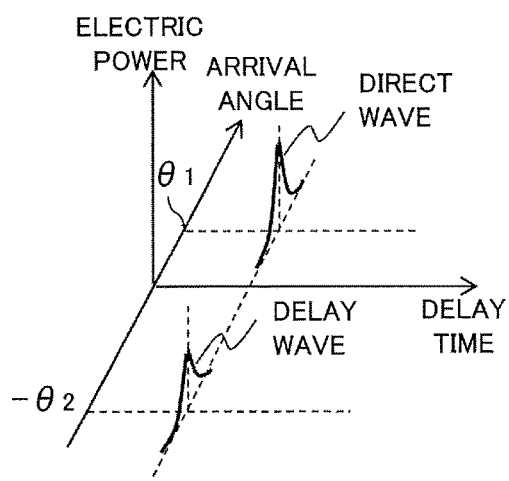
FIGS. 12(a) and 12(b) are diagrams illustrating a two-dimensional map indicating a relationship between a delay time and an arrival angle in the case where a delay time is short in the second embodiment.
Figure 12B:
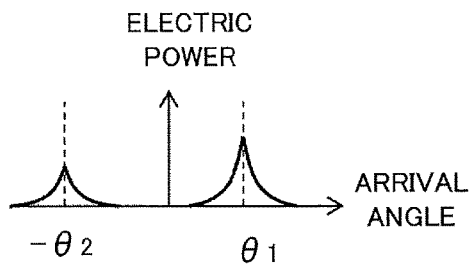

FIGS. 12(a) and 12(b) are diagrams illustrating the two-dimensional map indicating the relationship between the delay time and the arrival angle in the case where the delay time is short in the second embodiment. Moreover, the radio wave environment illustrated in FIGS. 7(a) and 7(b) will be considered. If the number of antenna elements is small and the null point has a width, the two-dimensional map indicating the relationship between the delay time and the arrival angle is as in FIG. 12(a). The delay time is shorter than the delay time resolution of the delay profile, and thus the direct wave and the delay wave exist on the same delay time index. In this case, $f_b(\theta)$ obtained by cutting out the components of the direct wave and the delay wave in the arrival angle direction, is illustrated in FIG. 12(b). This $f_b(\theta)$ can be expressed by the following expression.

$$f_b(\theta)=g(\theta-\theta_1)+g(\theta+\theta_2)=g(\theta)\otimes(\delta(\theta-\theta_1)+\delta(\theta+\theta_2)) \quad \text{Expression (6)}$$

From the expression (5) and the expression (6), the signal (hereinafter, $f_a(\theta)$ and $f_b(\theta)$ are expressed by $f(\theta)$) obtained by cutting out the two-dimensional map in which the width of the null point is wide at a specific delay time is a convolution of $g(\theta)$ calculated from the shape of the directional characteristic of the array antenna and an ideal signal having a very narrow null point width (the term expressed by the delta function). The convolution operation is converted to multiplication by a Fourier transform, and thus it is understood that, in order to correct the spread of the width of the null point, it is sufficient to calculate $F(\xi)$ by applying the Fourier transform to $f(\theta)$ obtained by cutting out the two-dimensional map at the specific delay time, to calculate $F'(\xi)=F(\xi)/G(\xi)$ by dividing this $F(\xi)$ by $G(\xi)$ obtained by applying the Fourier transform to $g(\theta)$, and then to calculate a result $f'(\theta)$ obtained by applying an inverse Fourier transform to $F'(\xi)$.

Figure 13:
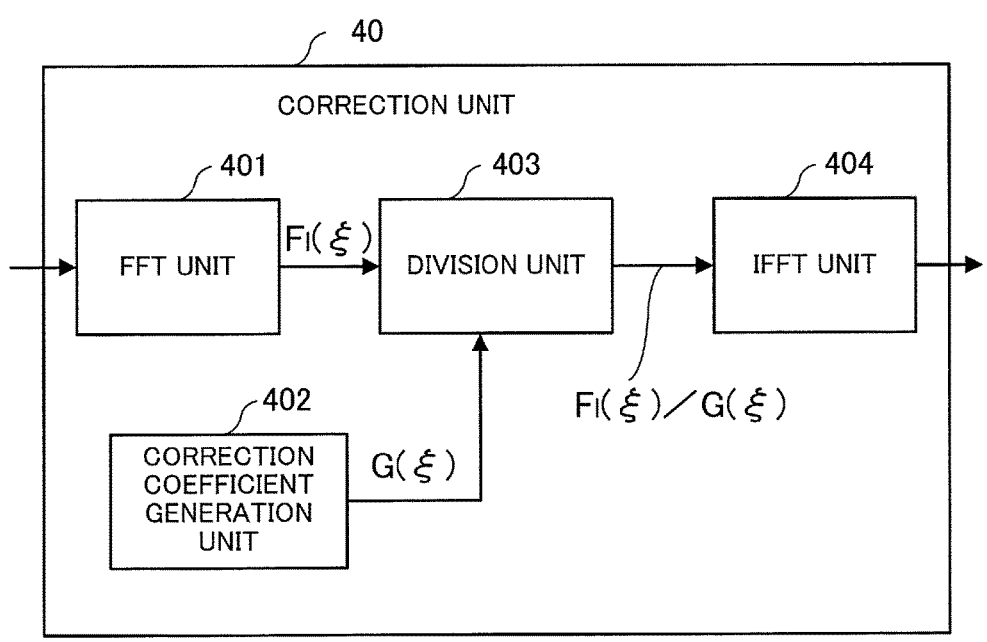
FIG. 13 is a block diagram schematically illustrating a configuration of a correction unit of FIG. 10.

FIG. 13 is a block diagram schematically illustrating a configuration of the correction unit 40 of FIG. 10. A Fourier transform (FFT) unit 401 calculates $F_l(\xi)$ ($l=0, 1, \ldots, L-1$) by applying the Fourier transform to $f_l(\theta)$ obtained by cutting out the two-dimensional map at the delay time index l ($l=0, 1, \ldots, L-1$). A correction coefficient generation unit 402 outputs $G(\xi)$ that is prepared in advance. A division unit 403 calculates $F_l(\xi)/G(\xi)$ ($l=0, 1, \ldots, L-1$), by dividing the signal output from the Fourier transform unit 401 by the signal output from the correction coefficient generation unit 402. Lastly, an inverse Fourier transform (IFFT) unit 404 outputs a result obtained by applying the inverse Fourier transform to the output of the division unit.

The above $\theta$ and $\xi$ are discrete signals, and a discrete Fourier transform and an inverse discrete Fourier transform are performed as the Fourier transform and the inverse Fourier transform. Moreover, if the sample number $2\pi/\Delta\theta$ of the arrival angles is a power of 2, FFT and IFFT can achieve it.

2-3 Effect of Second Embodiment

As described above, according to the receiver apparatus 2 and the reception method according to the second embodiment, when the number N of antenna elements is a comparatively small number, the fall of the array antenna gain around the null point is gradual and the width of the null point is wide, the two-dimensional map is corrected by utilizing the shape of the spread of the null point which is decided uniquely from the shape of the directional characteristic of the array antenna. Hence, there is an effect of improving the estimation accuracy of the arrival angle $\theta_1$ of the direct wave.

3 Third Embodiment

3-1 Configuration of Third Embodiment

The receiver apparatuses 1 and 2 according to the first and second embodiments estimate the arrival angle $\theta_1$ of the direct wave, while sequentially changing the direction of the null point, with respect to the signals received by the array antenna. This process procedure is effective in a case where the transmitter transmits the radio wave continuously. However, it is possible that, in a case where the transmitter transmits a signal of a predetermined frame length, the scan of the null point (i.e., the process for estimating the arrival angle $\theta_1$ of the direct wave, while the direction of the null point is changed sequentially) is not completed during the frame period of the signal.

Thus, a third embodiment provides a receiver apparatus 3 and a reception method which can also deal with a case in which the frame length of a frame that composes a signal transmitted from the transmitter is limited.

Figure 14:
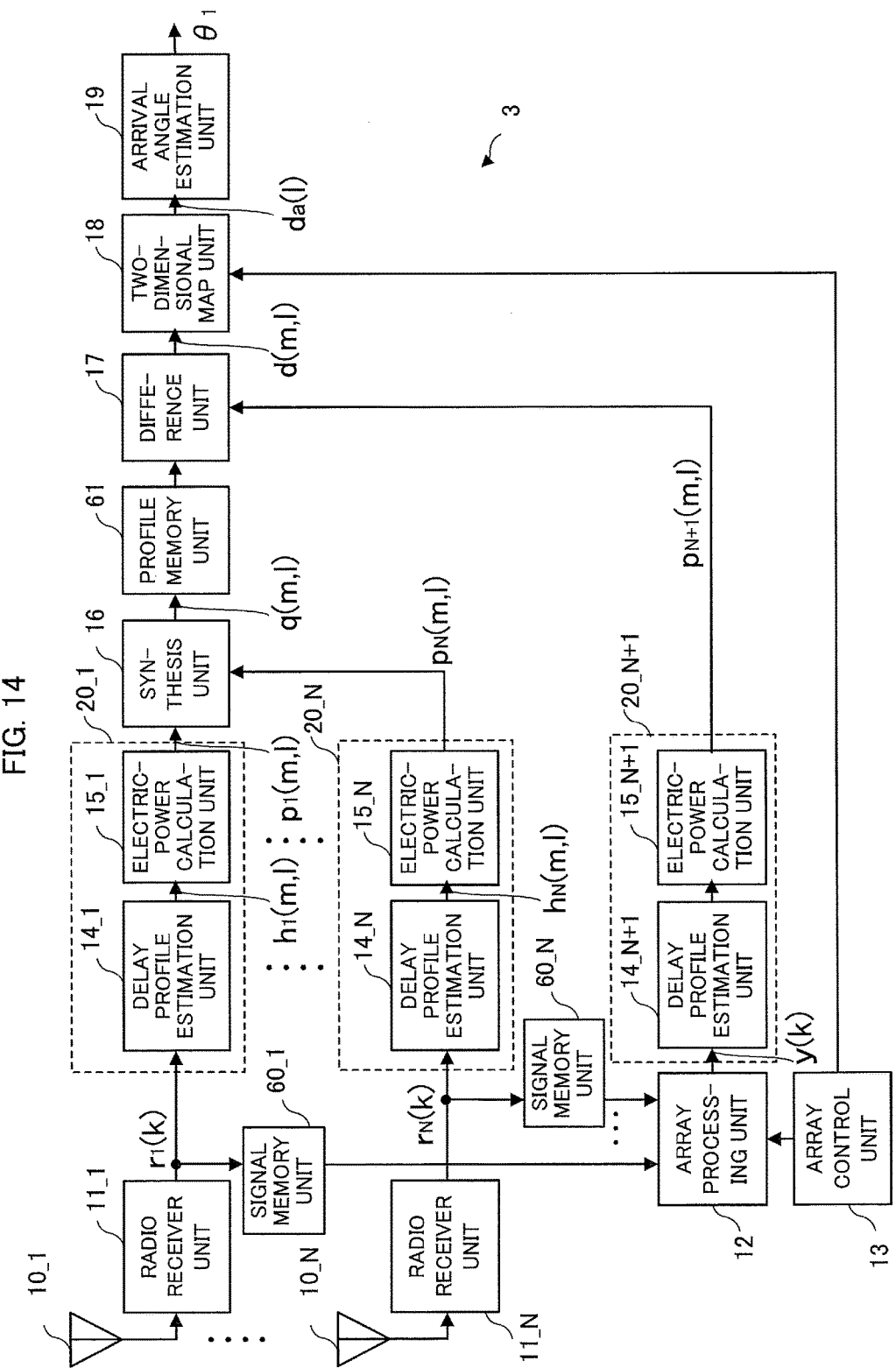
FIG. 14 is a block diagram schematically illustrating a configuration of a receiver apparatus according to a third embodiment of the present invention.

FIG. 14 is a block diagram schematically illustrating a configuration of the receiver apparatus 3 according to the third embodiment of the present invention. In FIG. 14, the components that are the same as or correspond to the components illustrated in FIG. 1 are denoted with the same reference signs as the reference signs illustrated in FIG. 1. The receiver apparatus 3 illustrated in FIG. 14 differs from the receiver apparatus 1 according to the first embodiment in including signal memory units 60_1, . . . , 60_N and including a profile memory unit 61. With respect to the other points, the receiver apparatus 3 according to the third embodiment is the same as the receiver apparatus 1 according to the first embodiment.

3-2 Operation of Third Embodiment

In the third embodiment, a reception signal of a predetermined period T seconds is used. Here, T is a time that is equal to or shorter than the frame length of the transmission signal.

The signal memory units 60_1, . . . , 60_N of FIG. 14 temporarily store the outputs of the radio receiver units 11_1, . . . , 11_N of T seconds. Moreover, the profile memory unit 61 temporarily stores the synthesized electric-power delay profile q(m, l) calculated from the reception signals of T seconds. During T seconds in which the radio receiver units 11_1, . . . , 11_N receive the signal via the antenna elements, the radio receiver units 11_1, . . . , 11_N, the delay profile estimation units 14_1, . . . , 14_N, the electric-power calculation units 15_1, . . . , 15_N, and the synthesis unit 16 of FIG. 14 operate, but the remaining functions do not operate.

At a time point when the storing of the signals of T seconds in the signal memory units 60_1, . . . , 60_N and the profile memory unit 61 has been finished, the array processing unit 12, the array control unit 13, the delay profile estimation unit 14_N+1, the electric-power calculation unit 15_N+1, the difference unit 17, the two-dimensional map unit 18, and the arrival angle estimation unit 19 start the operations.

The array control unit 13 changes the direction of the null point every M symbols. Only the signals of T seconds exists in the signal memory units 60_1, . . . , 60_N, and thus the array processing unit 12 scans the null point in all directions by reading out the signals of T seconds repeatedly. The operations of the delay profile estimation unit 14_N+1 and the electric-power calculation unit 15_N+1 are the same as the first embodiment.

The difference unit 17 reads out the synthesized electric-power delay profile q(m, l) from the profile memory unit 61, and calculates the difference electric-power delay profile d(m, l), with respect to the electric-power delay profile $p_{N+1}$(m, l) that is output every M symbols from the electric-power calculation unit 15_N+1. The operations of the two-dimensional map unit 18 and the arrival angle estimation unit 19 are the same as the case of the first embodiment.

Moreover, the correction unit 40 described in the second embodiment may be added to the receiver apparatus 3 of the third embodiment.

3-3 Effect of Third Embodiment

As described above, the receiver apparatus 3 according to the third embodiment stores in the memory the signals corresponding to the reception signals of the predetermined period T seconds and creates the two-dimensional map while reading out the signals repeatedly, and thereby there is an effect that the arrival angle $\theta_1$ of the direct wave can be estimated accurately even in a case where the frame length is limited.

4 Fourth Embodiment

4-1 Process According to Fourth Embodiment

A reception method according to a fourth embodiment is the same as the process by the receiver apparatus 1 according to the first embodiment. Thus, FIG. 1 is also referred to in the description of the fourth embodiment.

The reception method according to the fourth embodiment includes a step (S1) of initializing (setting in a predetermined direction) the null direction by the array control unit 13, a reception step (S2) of receiving a radio signal by the radio receiver units 11_1, . . . , 11_N, and a first estimation step (S3, S4) of estimating N first electric-power delay profiles $p_1$(k), . . . , $p_N$(k). Moreover, the reception method according to the fourth embodiment includes a synthesis step (step S5) of generating the synthesized electric-power delay profile q(m l), an array process step (S6) of generating the array process signal y(k), and a second estimation step (S7, S8) of estimating the second electric-power delay profile $p_{N+1}$(m, l) from the array process signal y(k). Further, the reception method according to the fourth embodiment includes a difference step (S9) of generating the difference electric-power delay profile d(m, l) by subtracting the second electric-power delay profile $p_{N+1}$(m, l) from the synthesized electric-power delay profile q(m, l), and a two-dimensional map step (S10) of creating the two-dimensional map indicating the relationship between the delay time and the arrival angle of the incoming wave on the basis of the difference electric-power delay profile d(m, l) and the direction of the null point designated (changed) by the array control unit 13. Furthermore, the reception method according to the fourth embodiment includes a step (S11, S12) of changing the direction of the null point by scanning the null point by the array control unit 13, to repeatedly execute the reception step (S2), the first estimation step (S3, S4), the synthesis step (S5), the array process step (S6), the second estimation step (S7, S8), the difference step (S9), and the two-dimensional map step (S10), and an arrival angle estimation step (S13) of estimating and outputting the arrival angle $\theta_1$ of the direct wave among the incoming waves when the null point scanning is completed with regard to all directions. In the arrival angle estimation step (S13), a component having the shortest delay time and the largest electric power in the carrier wave on the two-dimensional map is determined as the direct wave, and the arrival angle $\theta_1$ of the direct wave is estimated.

Next, the reception method according to the fourth embodiment will be described more specifically on the basis of FIG. 15. In the step (S1) for initializing the null direction of FIG. 15, the array control unit 13 performs initialization, which is a process for setting the null direction of the array antenna to $-\pi$ for example.

In the reception step (S2), with respect to the signals received through the N antenna elements 10_1, . . . , 10_N, the radio receiver units 11_1, . . . , 11_N each convert the reception signal to the baseband signal by performing the frequency conversion, and generate the digital signals $r_1$(k), . . . , $r_N$(k) by performing the AD conversion of this baseband signal. The process of the reception step (S2) is the same as the process by the radio receiver units 11_1, ..., 11_N in the first embodiment.

In the first estimation step (S3, S4), the delay profiles $h_n(m, l)$ corresponding to the N antenna elements 10_1, ..., 10_N are estimated on the basis of the digital signals $r_1(k)$, ..., $r_N(k)$ generated in the reception step S2. The calculation method of the delay profiles depends on the transmission method employed by the communication system.

Figure 15:
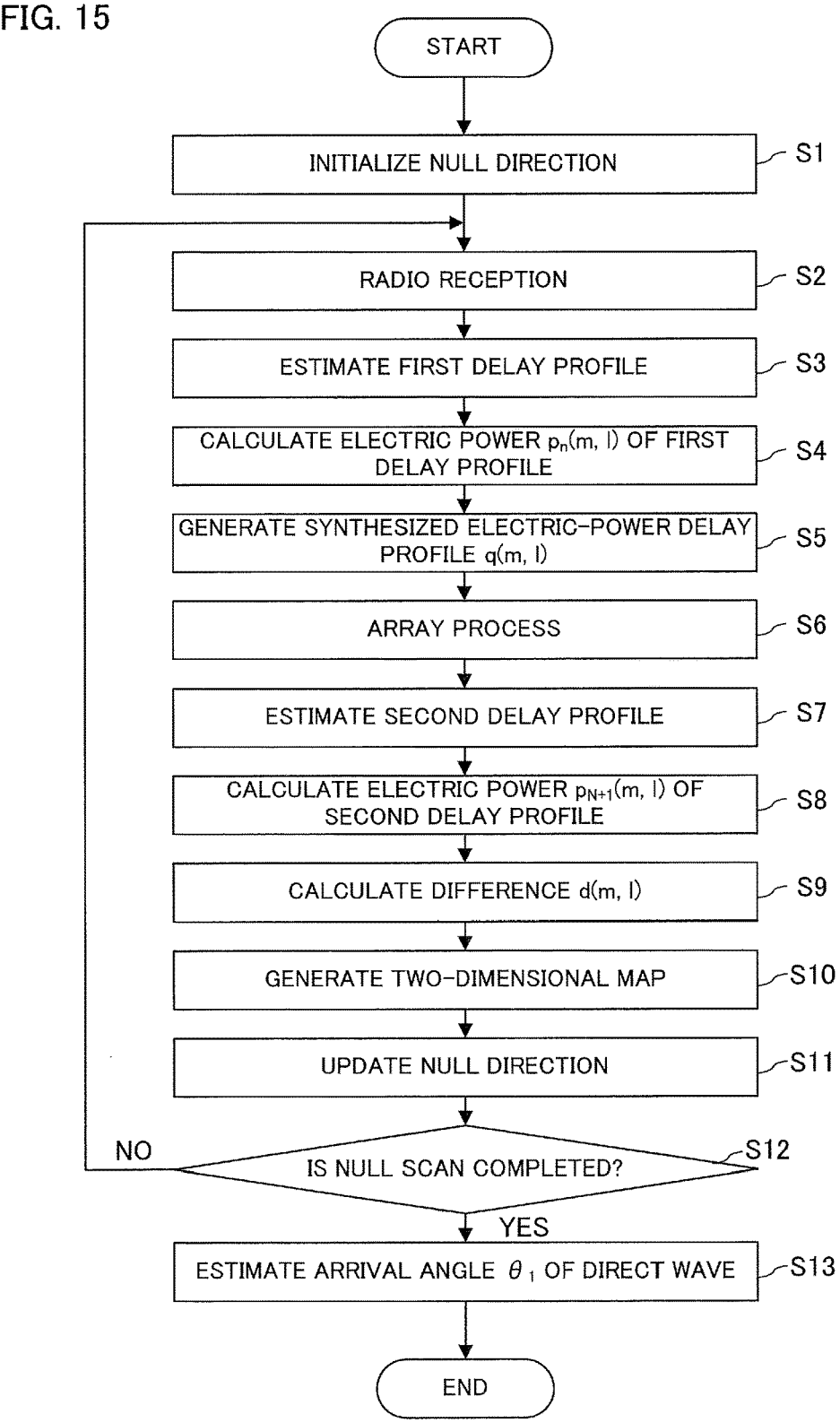
FIG. 15 is a flowchart illustrating a reception method according to a fourth embodiment of the present invention.
Figure 16:
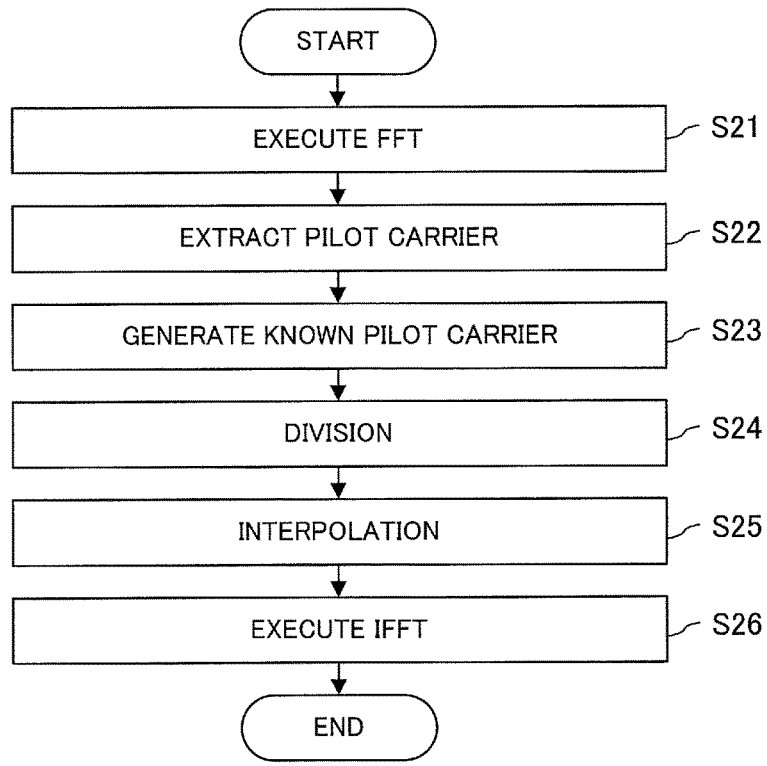
FIG. 16 is a flowchart illustrating a delay profile estimation process in the OFDM transmission method.

FIG. 16 is a flowchart illustrating the step (S3) of estimating the first delay profiles in the OFDM transmission method. The process of FIG. 16 is the same process as the process of FIG. 2 in the first embodiment. As illustrated in FIG. 16, the step (S3) of estimating the first delay profiles includes an FFT step (S21), a pilot extraction step (S22), a pilot generation step (S23), a division step (S24), an interpolation step (S25), and an IFFT step (S26), for example. In the FFT step (S21), the digital signals $r_1(k)$, ..., $r_N(k)$ generated in the reception step (S2) of FIG. 15 are converted from the time axis to the frequency axis with respect to each symbol, and thereby the subcarriers are generated. The pilot carriers generated in the FFT step (S21) are extracted in the pilot extraction step (S22), and the known pilot carrier is generated in the pilot generation step (S23). In the division step (S24), the pilot carrier extracted in the pilot extraction step (S22) is divided by the known pilot carrier generated by the pilot generation step (S23), and thereby the transfer function of the transmission path that acts on the pilot carriers included in the reception signal is generated. In the interpolation step (S25), the transfer function of the transmission path for all subcarriers is generated by performing the interpolation on the transfer function of the transmission path that acts on the pilot carriers in the symbol direction and the subcarrier direction. In the IFFT step (S26), the delay profile is generated by converting the transfer function of the transmission path to the transfer function of the time axis. The process illustrated in FIG. 16 is the same as the process by the delay profile estimation units 14_1, ..., 14_N+1 in the first embodiment (FIGS. 1 and 2).

Figure 17:
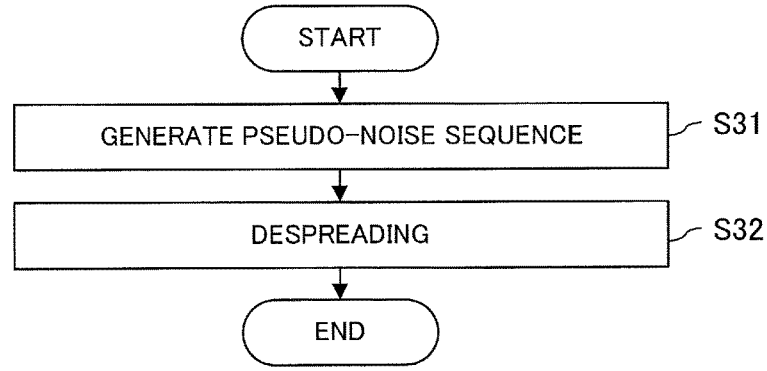
FIG. 17 is a flowchart illustrating a delay profile estimation process in the DSSS transmission method.

FIG. 17 is a flowchart illustrating the step (S3) of estimating the first delay profiles in the DSSS transmission method. The process of FIG. 17 is the same process as the process of FIG. 3 in the first embodiment. As illustrated in FIG. 17, the step (S3) of estimating the first delay profiles includes a step (S31) of generating the pseudo-noise sequence and a step (S32) of performing a despreading process, for example. The pseudo-noise sequence used at the time of spreading at the transmitter side is generated in the pseudo-noise sequence generation step (S31), and the sliding correlation with the signal generated in the reception step (S2) of FIG. 15 is calculated and output for each symbol in the despreading step (S32). This output in of the despreading step is the delay profile. The process illustrated in FIG. 17 is the same as the process by the delay profile estimation units 14_1, ..., 14_N+1 in the first embodiment (FIGS. 1 and 3).

As described in FIGS. 16 and 17, the delay profile is output for each symbol. In the following, the delay profile estimation result of the m-th symbol for the n-th antenna element is expressed by $h_n(m, l)$. Here, l is the index of the delay time. The delay time resolution $\Delta\tau$ is already described in the first embodiment.

In the step (S4) of calculating the electric power of the first delay profiles of FIG. 15, the electric power $p_n(m, l)$ (n=1, ..., N) is calculated and output for each delay time of the delay profile generated in the estimation step (S3) of the first delay profile. The process of step (S4) is the same as the process by the electric-power calculation units 15_1, ..., 15_N in the first embodiment.

In the synthesis step (S5) of FIG. 15, the first electric-power delay profiles generated in the step (S4) are synthesized to generate the synthesized electric-power delay profile q(m, l). The process of the step (S5) is the same as the process by the synthesis unit 16 in the first embodiment.

The array process step (S6) of FIG. 15 performs the array process for the signals $r_1(k)$, ..., $r_N(k)$ generated in the reception step (S2). The process of the step (S6) is the same as the process by the array processing unit 12 in the first embodiment.

In the estimation step (S7) of the second delay profile of FIG. 15, the delay profile is estimated from the signal y(k) generated by the array process. The estimation method of the delay profile is the same as the estimation step (S3) of the first delay profile. Moreover, the process of the estimation step (S7) is the same as the process by the delay profile estimation unit 14_N+1 in the first embodiment.

The second electric power calculation step (S8) of FIG. 15 calculates and outputs the electric power for each delay time of the delay profile generated in the second delay profile estimation step (S7). The calculation method of the electric power is the same as the estimation step (S4) of the first electric-power delay profile. Moreover, the process of the step (S8) is the same as the process by the electric-power calculation unit 15_N+1 in the first embodiment.

The difference step (S9) of FIG. 15 outputs the difference electric-power delay profile d(m, l) obtained by subtracting the second electric-power delay profile $p_{N+1}(m, l)$ generated in the second electric power calculation step (S8) from the synthesized electric-power delay profile q(m, l) generated in the synthesis step (S6). The process of the difference step (S9) is the same as the process by the difference unit 17 in the first embodiment.

The two-dimensional map step (S10) of FIG. 15 creates the two-dimensional map of the delay time (arrival time) and the arrival direction (arrival angle) of the incoming wave, by using the electric-power delay profile (output of the difference step) of the incoming wave that arrives from the direction of the null point and the direction of the null point. The process of the two-dimensional map step (S10) is the same as the process by the two-dimensional map unit 18 in the first embodiment.

The null direction update step (S11) of FIG. 15 sequentially scans the null direction at $\Delta\theta$ intervals as in $$\theta_{NULL} = -\pi + a \times \Delta\theta \ (a=0,1,\ldots,2\pi/\Delta\theta-1).$$

During a period of $0 \le a < 2\pi/\Delta\theta$, the reception step (S2) to the null direction update step (S11) are executed repeatedly. When $a=2\pi/\Delta\theta$, the scan of the null direction in all directions from $-\pi$ to $\pi$ is completed, and thus the process proceeds to the next step. Incidentally, the scan direction $\theta_{NULL}$ of the null point is also used in the two-dimensional map step (S10).

The arrival angle estimation step (S13) of FIG. 15 estimates the arrival angle $\theta_1$ of the direct wave by using the two-dimensional map indicating the relationship between the delay time and the arrival angle of the incoming wave. Specifically, a certain threshold value is set; components that exceed the threshold value are searched for in the two-dimensional map; and the component having the shortest delay time among them is selected. This selected component is determined to be the direct wave. When a plurality of components are selected, the component having the largest electric power is determined to be the direct wave. Lastly, in the arrival angle estimation step (S13), the arrival angle that is determined to be the component of the direct wave in the two-dimensional map is output. The above threshold value may be decided in advance, and may be a value attenuated by a certain predetermined amount from the maximum value on the two-dimensional map. The process of the arrival angle estimation step (S13) is the same as the process by the arrival angle estimation unit 19 in the first embodiment.

The process illustrated in the flowchart of FIG. 15 is the same as the operation of the receiver apparatus 1 according to the first embodiment. Moreover, a process step by the array correction unit 40 (FIG. 10, FIG. 13) in the second embodiment may be inserted before the arrival angle estimation step (S13) in FIG. 15.

4-2 Effect of Fourth Embodiment

In patent reference 1, the direct wave and the delay wave are unable to be separated under the environment in which the delay wave whose delay time is shorter than the delay time resolution of the delay profile exists, and the estimation accuracy of the arrival angle of the direct wave degrades; whereas in the fourth embodiment, the direct wave and the delay wave can be separated by utilizing the null point of the array antenna in the same way as the first embodiment, and there is an effect that the arrival angle of the direct wave can be estimated accurately.

Moreover, in general, it is known that the null point of the array antenna has a sharper directional characteristic than the main lobe. Hence, in the same way as the first embodiment, there is an effect that the fourth embodiment can separate a plurality of incoming waves even with a smaller number of antenna elements in comparison with the technology described in patent reference 2 and patent reference 3 which separate the incoming waves by using the main lobe, and that the estimation accuracy of the arrival angle $\theta_1$ of the direct wave can be improved.

5 Variant Example

Figure 18:
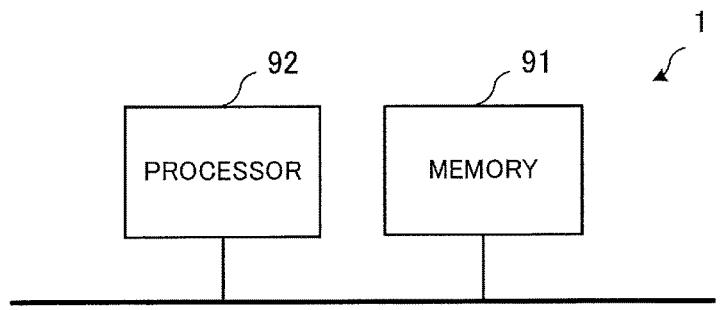
FIG. 18 is a hardware configuration diagram illustrating a receiver apparatus as a variant example of the first to third embodiments.

FIG. 18 is a hardware configuration diagram illustrating a configuration example of the receiver apparatuses according to the above first to third embodiments. The receiver apparatus 1 illustrated in FIG. 18 includes a memory 91 as a memory device for storing a program as software, and a processor 92 as an information processing unit for executing the program stored in the memory 91. The receiver apparatus 1 illustrated in FIG. 18 illustrates a specific example of the structures of the receiver apparatuses according to the first to third embodiments. The operation of the receiver apparatus 1 illustrated in FIG. 18 is the same as the operation of the receiver apparatuses according to the first to third embodiments or the reception method according to the fourth embodiment. The program stored in the memory 91 are a program that is executable in a computer including the processor 92, and can cause the computer to execute the process illustrated in the fourth embodiment (FIG. 15).

When the receiver apparatus 1 illustrated in FIG. 18 achieves the processes in the receiver apparatuses according to the first to third embodiments, each component of the receiver apparatus illustrated in FIG. 1, FIG. 10, and FIG. 14 is implemented by the processor 92 executing the program stored in the memory 91. Although a case in which the processor 92 and the memory 91 are used to configure each component of the receiver apparatus illustrated in FIG. 1, FIG. 10, and FIG. 14 has been illustrated as an example, a part of the components among the components of the receiver apparatus illustrated in FIG. 1, FIG. 10, and FIG. 14 may be configured with the processor 92 and the memory 91, and other parts may be configured with a hardware circuit. The reception operation described in the first to third embodiments can be achieved by the receiver apparatus illustrated in FIG. 18.

DESCRIPTION OF REFERENCE CHARACTERS

1, 2, 3: receiver apparatus, 10_1, . . . , 10_N: antenna element, 11_1, . . . , 11_N: radio receiver unit, 12: array processing unit, 13: array control unit, 14_1, . . . , 14_N+1: delay profile estimation unit, 15_1, . . . , 15_N+1: electric-power calculation unit, 16: synthesis unit, 17: difference unit, 18: two-dimensional map unit, 19: arrival angle estimation unit, 20_1, . . . , 20_N: electric-power delay profile estimation unit (first electric-power delay profile estimation unit), 20_N+1: electric-power delay profile estimation unit (second electric-power delay profile estimation unit), 40: correction unit, 60_1, . . . , 60_N: signal memory unit, 61: profile memory unit, 141_$n$: FFT unit, 142_$n$: pilot extraction unit, 143_$n$: pilot generation unit, 144_$n$: division unit, 145_$n$: interpolation unit, 146_$n$: IFFT unit, 148_$n$: pseudo-noise sequence generation unit, 149_$n$: despreading unit, 401: Fourier transform unit, 402: correction coefficient generation unit, 403: division unit, 404: inverse Fourier transform unit.

What is claimed is:

1. A receiver apparatus for receiving incoming waves which are radio waves that arrive at an array antenna including a plurality of antenna elements, the receiver apparatus comprising:
   a plurality of radio receiver units that generate a plurality of digital signals corresponding to a plurality of signals, on a basis of the plurality of signals received via the plurality of antenna elements;
   a processor; and
   a memory storing a program which, when executed by the processor, performs a process including,
      estimating a plurality of first electric-power delay profiles corresponding to the plurality of digital signals, on a basis of the plurality of digital signals;
      generating a synthesized electric-power delay profile by synthesizing the plurality of first electric-power delay profiles;
      changing a direction of a null point of the array antenna and generating an array process signal by performing an array process for the plurality of digital signals by directing the null point in the changed direction;
      estimating a second electric-power delay profile from the array process signal;
      generating a difference electric-power delay profile obtained by subtracting the second electric-power delay profile from the synthesized electric-power delay profile;
      creating a two-dimensional map indicating a relationship between delay times and arrival angles of the incoming waves, on a basis of the difference electric-power delay profile and the changed direction of the null point; and
      outputting an arrival angle of a component having a shortest delay time and a largest electric power, among the incoming waves on the two-dimensional map.

2. The receiver apparatus according to claim 1, the process further including:
   correcting the created two-dimensional map, and using the corrected two-dimensional map to determine the arrival angle, wherein the correcting includes:
outputting a Fourier-transformed signal obtained by applying a Fourier transform to a component of an arrival angle direction at each delay time on the created two-dimensional map;
dividing the Fourier-transformed signal by a correction coefficient; and
applying an inverse Fourier transform to the divided signal output,
wherein the correction coefficient is calculated on a basis of a shape of a directional characteristic of the array antenna.

3. The receiver apparatus according to claim 1, further comprising:
a signal memory unit that stores the plurality of digital signals generated by the plurality of radio receiver units; and
a profile memory unit that stores the synthesized electric-power delay profile generated by the synthesis unit,
wherein the two-dimensional map is created on a basis of the plurality of digital signals stored in the signal memory unit and the synthesized electric-power delay profile stored in the profile memory unit.

4. The receiver apparatus according to claim 1, further comprising the array antenna.

5. The receiver apparatus according to claim 1, wherein the change of the null point is performed within a range from $-\pi$ to $+\pi$ of the arrival angles of the incoming waves.

6. A reception method for receiving incoming waves which are radio waves that arrive at an array antenna including a plurality of antenna elements, the reception method comprising:
(a) generating a plurality of digital signals corresponding to a plurality of signals, on a basis of the plurality of signals received via the plurality of antenna elements;
(b) estimating a plurality of first electric-power delay profiles corresponding to the plurality of digital signals, on a basis of the plurality of digital signals;
(c) generating a synthesized electric-power delay profile by synthesizing the plurality of first electric-power delay profiles;
(d) changing a direction of a null point of the array antenna and generating an array process signal by performing an array process for the plurality of digital signals by directing the null point in the changed direction;
(e) estimating a second electric-power delay profile from the array process signal;
(f) generating a difference electric-power delay profile obtained by subtracting the second electric-power delay profile from the synthesized electric-power delay profile;
(g) creating a two-dimensional map indicating a relationship between delay times and arrival angles of the incoming waves, on a basis of the difference electric-power delay profile and the changed direction of the null point;
(h) changing the direction of the null point and executing steps (a)-(g); and
(i) outputting an arrival angle of a component having a shortest delay time and a largest electric power, among the incoming waves on the two-dimensional map.

* * * * *